United States Patent [19]
Bloomberg et al.

[11] Patent Number: 5,131,049
[45] Date of Patent: Jul. 14, 1992

[54] IDENTIFICATION, CHARACTERIZATION, AND SEGMENTATION OF HALFTONE OR STIPPLED REGIONS OF BINARY IMAGES BY GROWING A SEED TO A CLIPPING MASK

[75] Inventors: Dan S. Bloomberg, Palo Alto, Calif.; William T. Crocca, Rochester, N.Y.

[73] Assignee: Xerox Corporation, Rochester, N.Y.

[21] Appl. No.: 448,193

[22] Filed: Dec. 8, 1989

[51] Int. Cl.⁵ .............................................. G06K 9/34
[52] U.S. Cl. .......................................... 382/9; 382/55; 358/456
[58] Field of Search ............... 358/447, 448, 453, 455, 358/456, 457, 458, 461, 463, 462, 452, 454, 464, 465, 466; 382/54, 31, 27, 28, 55, 9

[56] References Cited

U.S. PATENT DOCUMENTS

| | | | |
|---|---|---|---|
| 4,368,463 | 1/1983 | Quilliam | 340/744 |
| 4,414,685 | 11/1983 | Sternberg | 382/49 |
| 4,481,665 | 11/1984 | Ota | 382/48 |
| 4,503,461 | 4/1985 | Nishimura | 358/464 |
| 4,503,556 | 3/1985 | Scherl et al. | 382/9 |
| 4,668,995 | 5/1987 | Chen et al. | 382/54 |
| 4,674,125 | 6/1987 | Carlson et al. | 382/49 |
| 4,698,779 | 10/1987 | Holden et al. | 382/9 |
| 4,700,400 | 10/1987 | Ross | 382/27 |
| 4,718,101 | 1/1988 | Ariga et al. | 382/9 |
| 4,722,008 | 1/1988 | Ibaraki et al. | 358/456 |
| 4,741,046 | 4/1988 | Matsunawa et al. | 382/9 |
| 4,742,558 | 5/1988 | Ishibashi et al. | 382/56 |
| 4,750,209 | 6/1988 | Shimura et al. | 382/9 |
| 4,754,488 | 6/1988 | Lyke | 382/122 |
| 4,760,605 | 7/1988 | David et al. | 382/47 |
| 4,786,976 | 11/1988 | Takao et al. | 382/53 |
| 4,791,679 | 12/1988 | Barski et al. | 382/55 |
| 4,805,031 | 2/1989 | Powell | 358/167 |
| 4,811,115 | 3/1989 | Lin et al. | 358/456 |
| 4,817,186 | 3/1989 | Goolsbey et al. | 382/9 |
| 4,827,330 | 5/1989 | Walsh et al. | 382/57 |
| 4,858,018 | 8/1989 | Tanaka | 358/456 |
| 4,893,188 | 1/1990 | Murakami et al. | 382/9 |
| 4,906,983 | 3/1990 | Parker | 340/747 |

FOREIGN PATENT DOCUMENTS

| | | |
|---|---|---|
| 0287995 | 10/1988 | European Pat. Off. . |
| 0288266 | 10/1988 | European Pat. Off. . |
| 0308673 | 3/1989 | European Pat. Off. . |
| 61-225974 | 10/1986 | Japan . |

OTHER PUBLICATIONS

K. Y. Wong et al.; "Document Analysis System"; IBM J. Res. Development; vol. 26, No. 6; Nov., 1982.
Stanley R. Sternberg; "Biomedical Image Processing"; IEEE; Jan. 1983.
Petros Maragos; "Tutorial on Advances in Morphological Image Processing and Analysis"; Optical Engineering; vol. 26, No. 7; Jul. 1987.
Robert M. Haralick et al.; "Image Analysis Using Mathematical Morphology"; IEEE; vol. PAM1-9, No. 4; Jul. 1987.

*Primary Examiner*—Leo H. Boudreau
*Assistant Examiner*—Barry Stellrecht
*Attorney, Agent, or Firm*—Townsend and Townsend

[57] ABSTRACT

A method for creating a mask for separating halftone regions in a binary image from other regions comprises: constructing a seed image that includes pixels only in halftone regions and at least one pixel in every halftone region (67); constructing a clipping mask that covers in a connected manner all ON pixels in halftone regions (70); and filling the seed while clipping to the mask (72). Thresholded reductions and morphological operations are preferred.

25 Claims, 12 Drawing Sheets

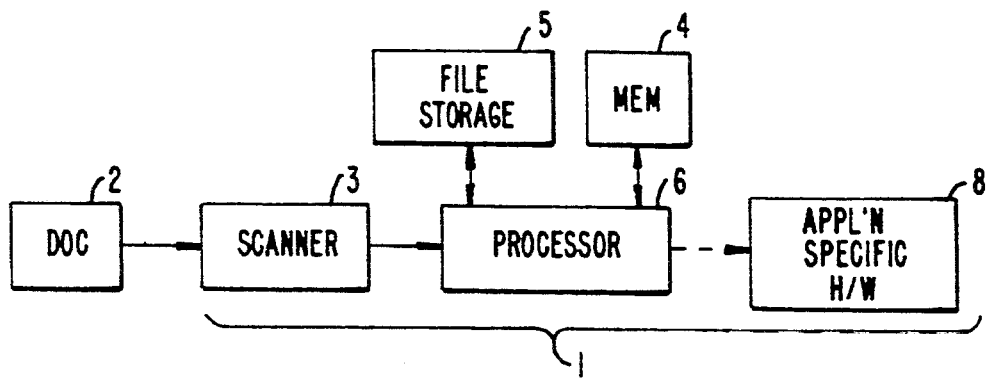
FIG._1A.
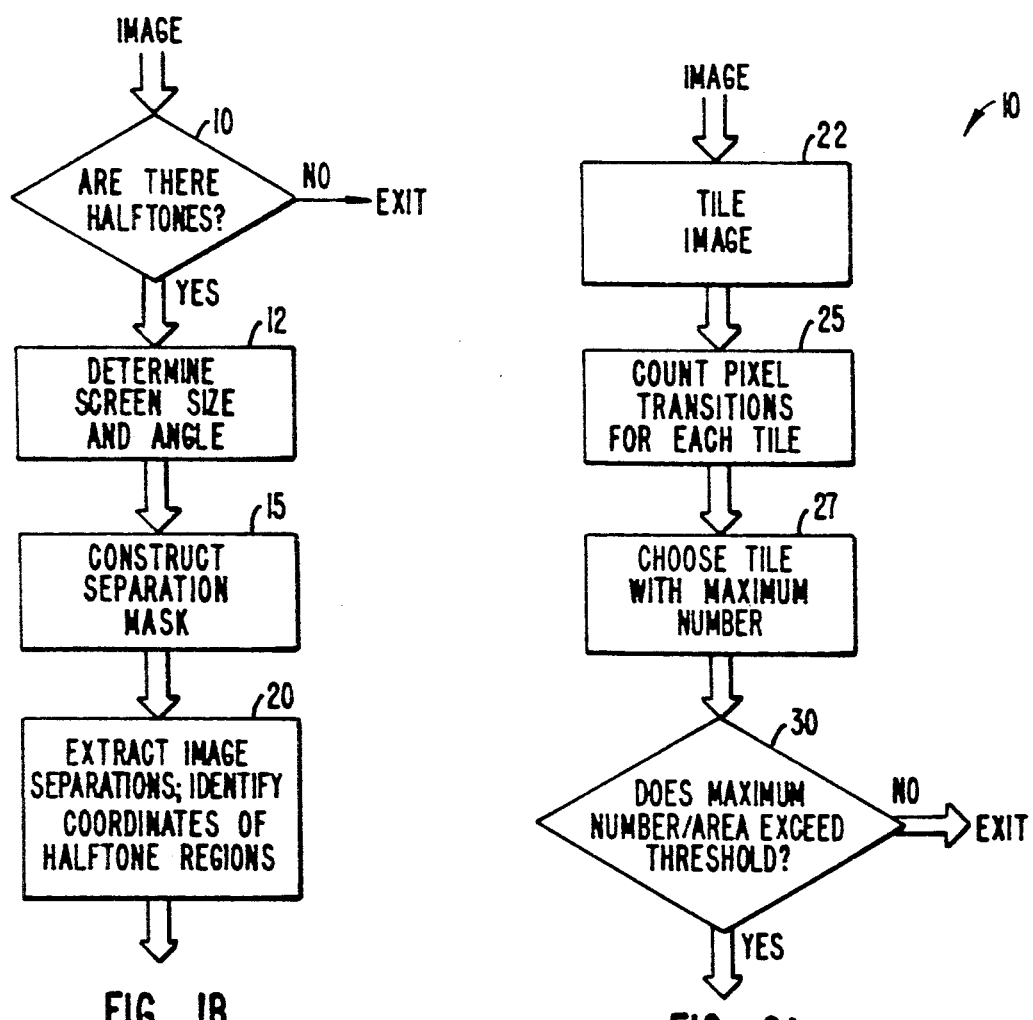
FIG._1B.
FIG._2A.

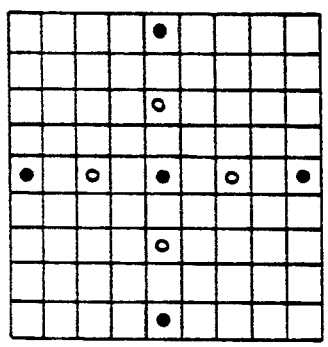
PERIOD=4, ANGLE=0 DEGREES
FIG._4A.
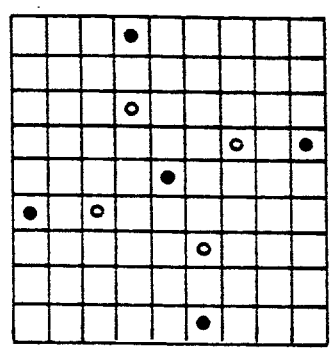
PERIOD=4, ANGLE=14 DEGREES
FIG._4B.
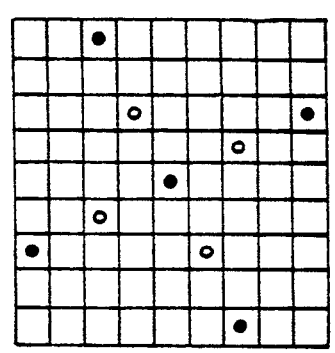
PERIOD=4, ANGLE=27 DEGREES
FIG._4C.
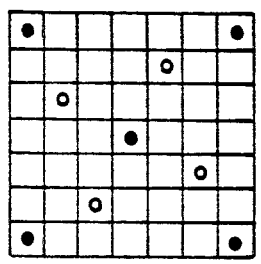
PERIOD=4, ANGLE=45 DEGREES
FIG._4D.
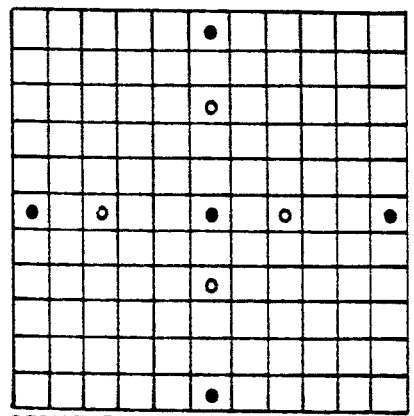
PERIOD=5, ANGLE=0 DEGREES
FIG._5A.
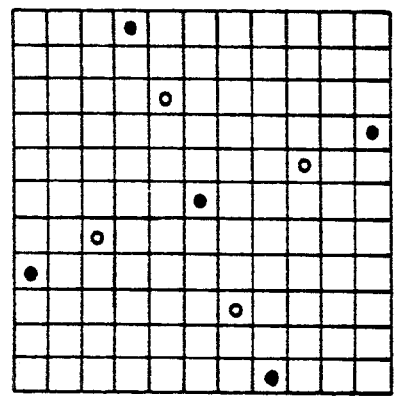
PERIOD=5, ANGLE=22 DEGREES
FIG._5B.
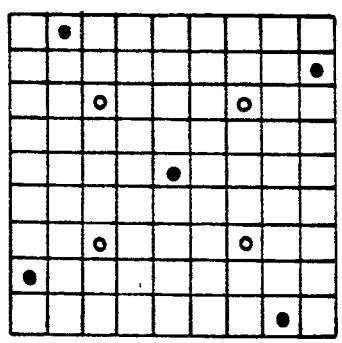
PERIOD=5, ANGLE=37 DEGREES
FIG._5C.

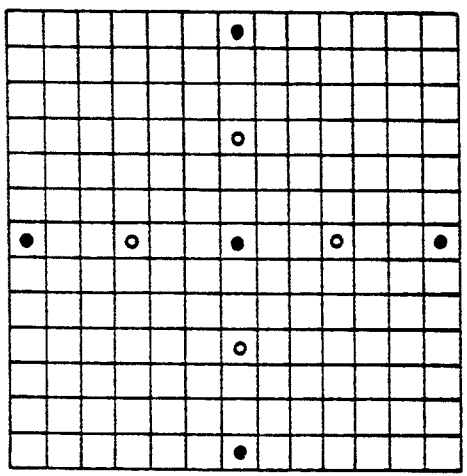
PERIOD=6, ANGLE=0 DEGREES
FIG._6A.
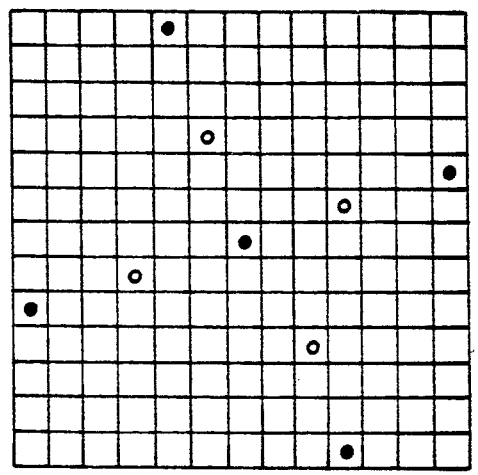
PERIOD=6, ANGLE=18 DEGREES
FIG._6B.
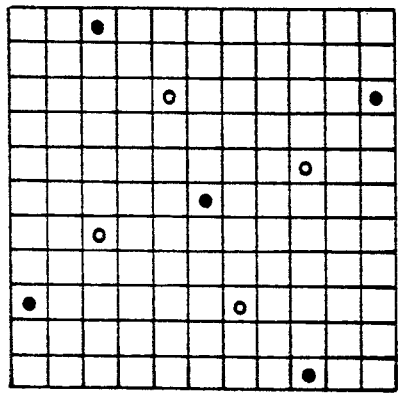
PERIOD=6, ANGLE=31 DEGREES
FIG._6C.
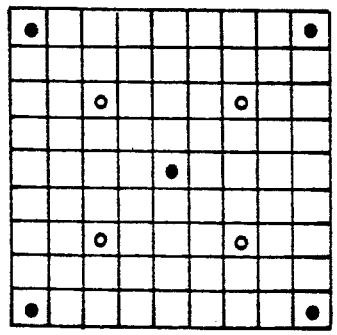
PERIOD=6, ANGLE=45 DEGREES
FIG._6D.
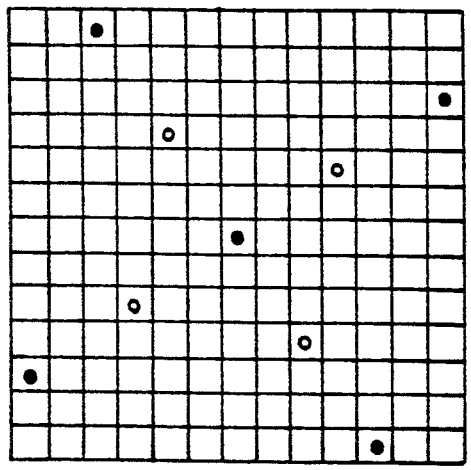
PERIOD=7, ANGLE=34 DEGREES
FIG._7A.
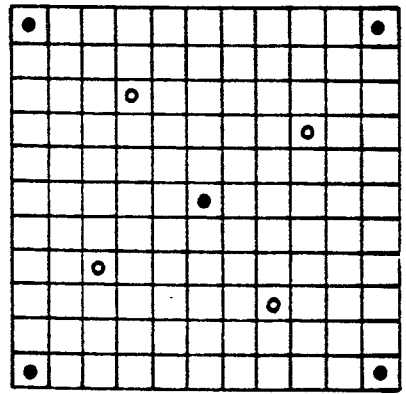
PERIOD=7, ANGLE=45 DEGREES
FIG._7B.

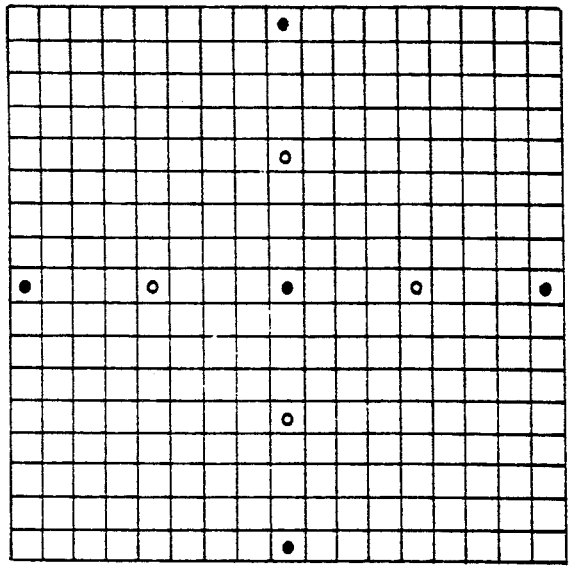
PERIOD=8, ANGLE=0 DEGREES
FIG._8A.
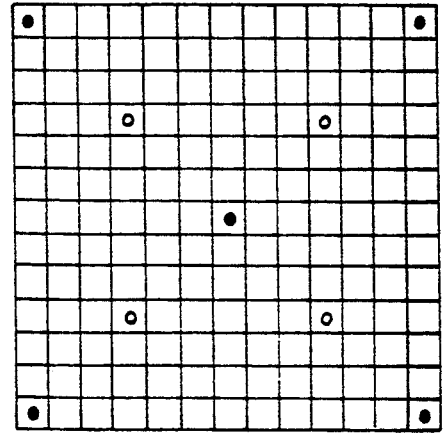
PERIOD=8, ANGLE=45 DEGREES
FIG._8D.
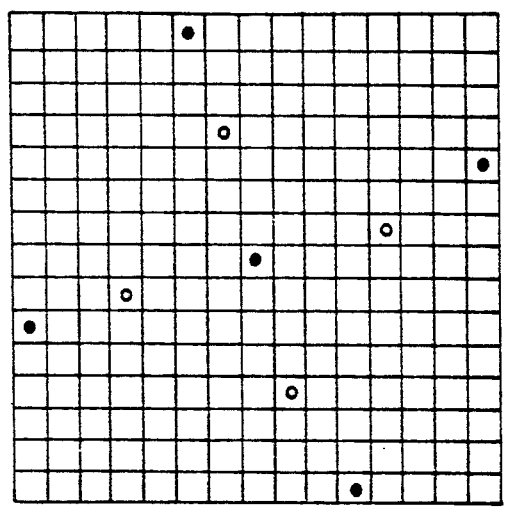
PERIOD=8, ANGLE=23 DEGREES
FIG._8B.
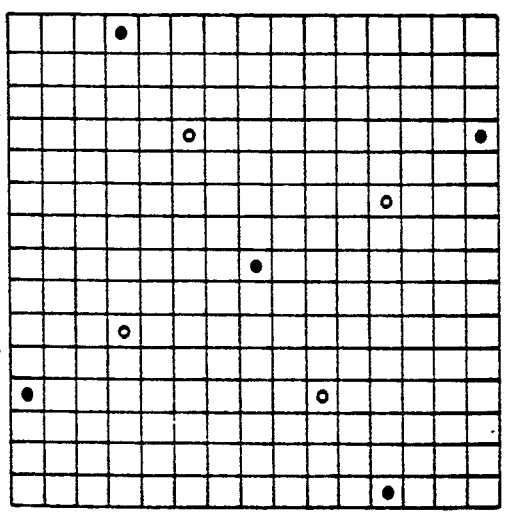
PERIOD=8, ANGLE=30 DEGREES
FIG._8C.

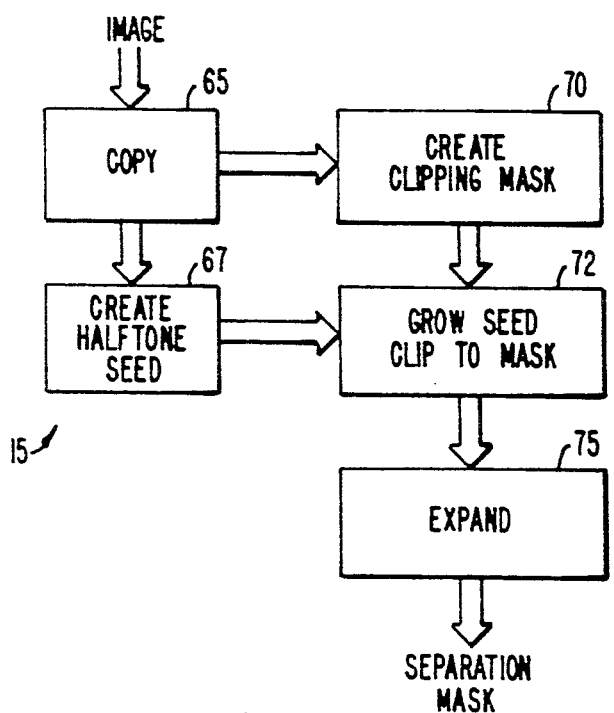
FIG._9A.
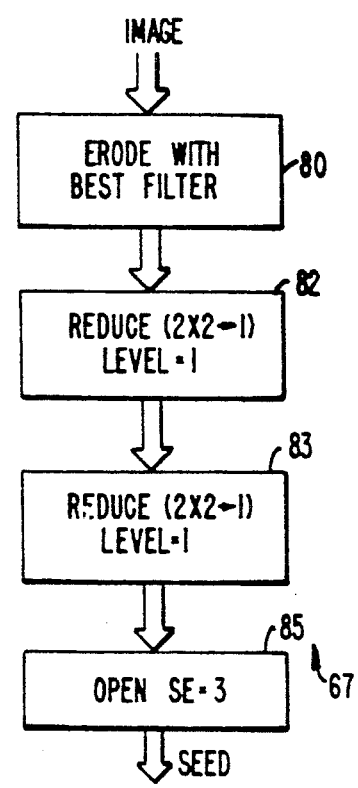
FIG._9B.
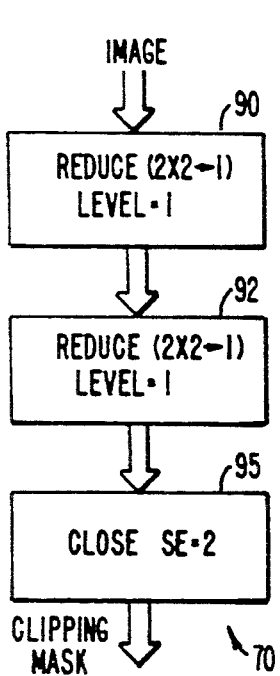
FIG._9C.
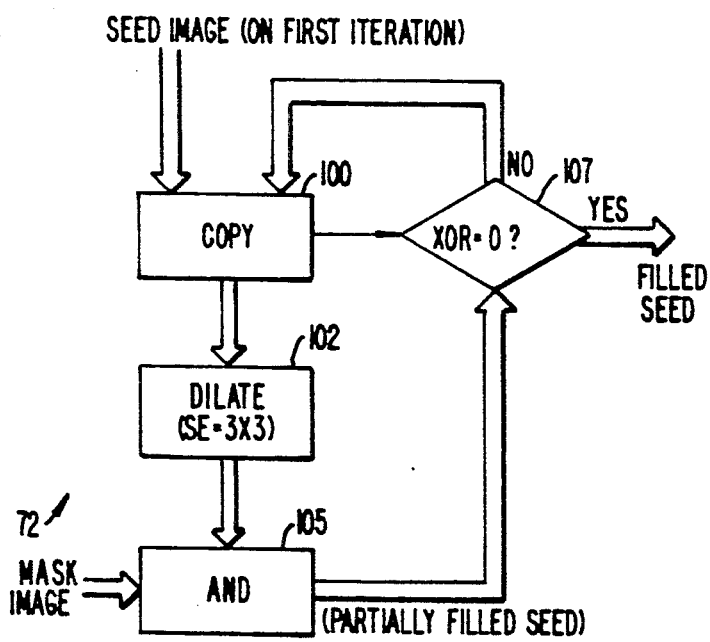
FIG._9D.

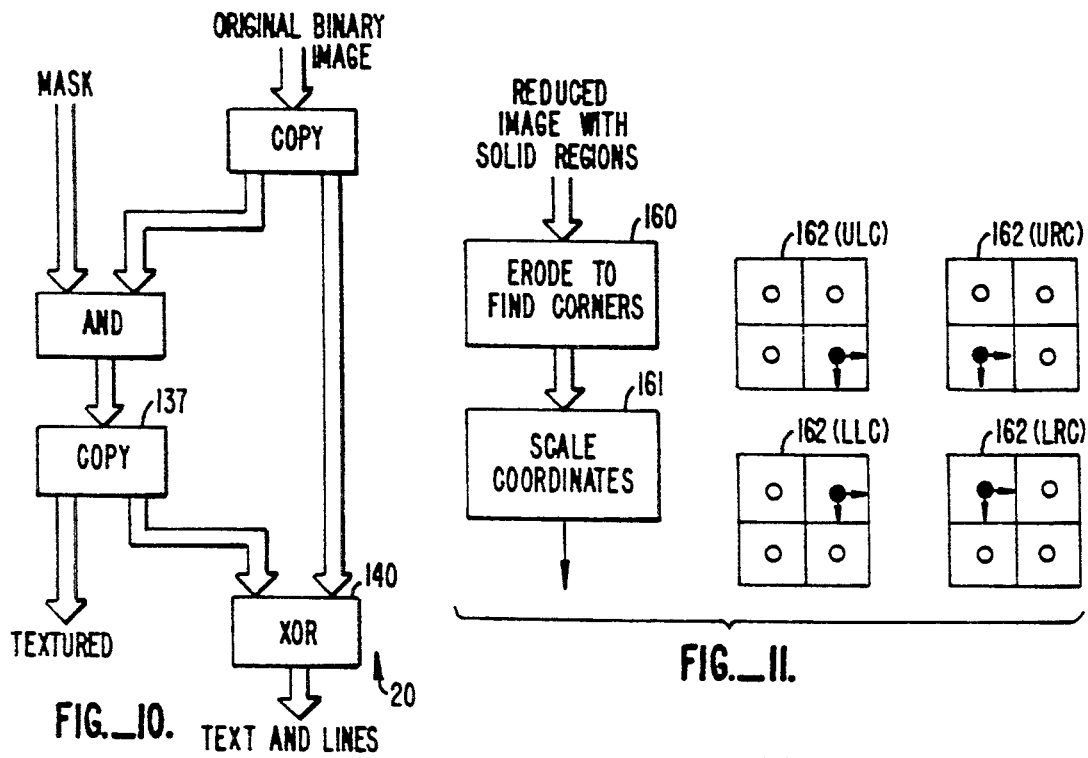
FIG._10.
FIG._11.
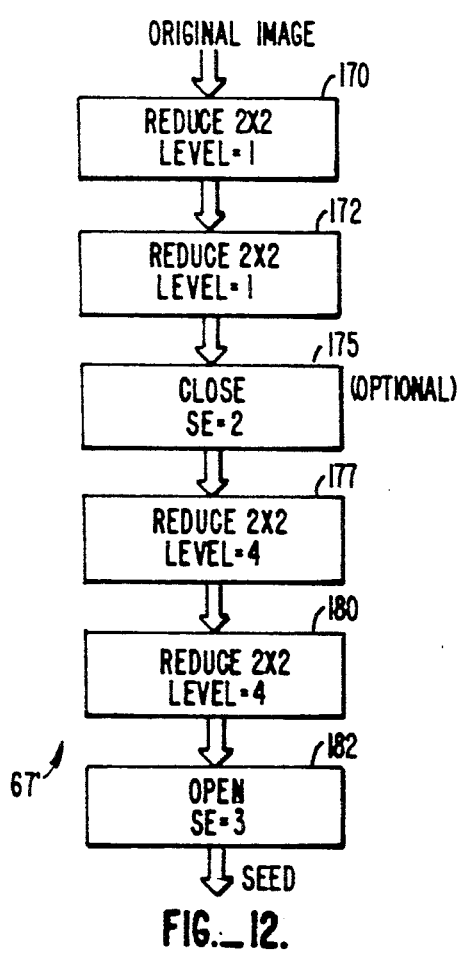
FIG._12.
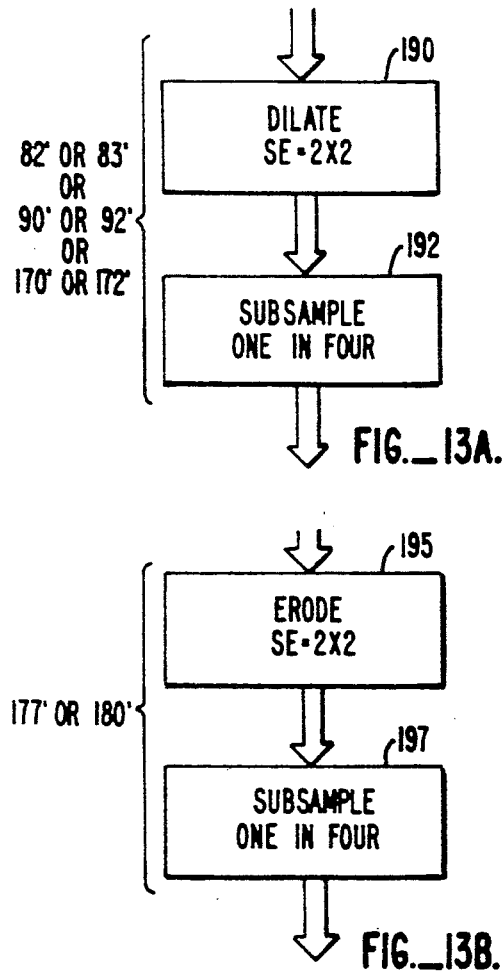
FIG._13A.
FIG._13B.

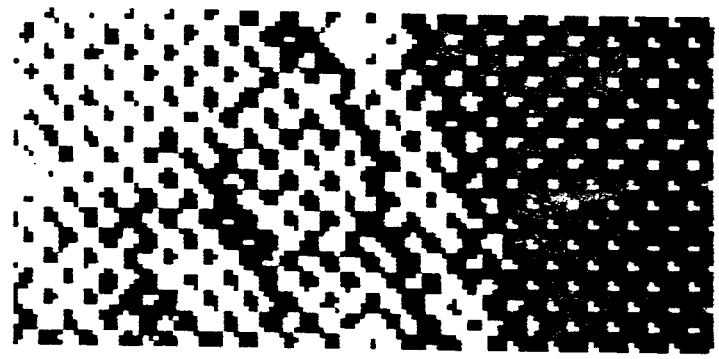
FIG._14.

NUMBER OF ON PIXELS AFTER EACH FILTER
X: 0 TO 17; Y: 0 TO 260
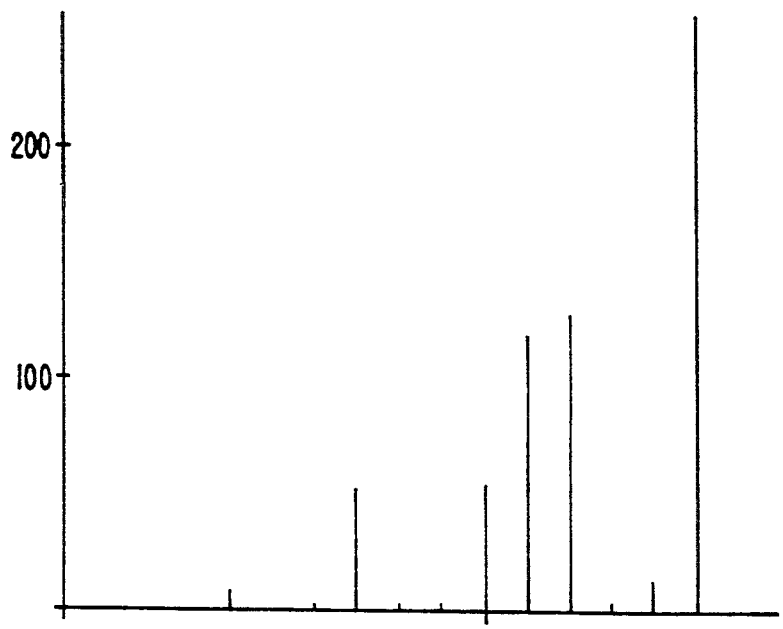
FIG._15A.
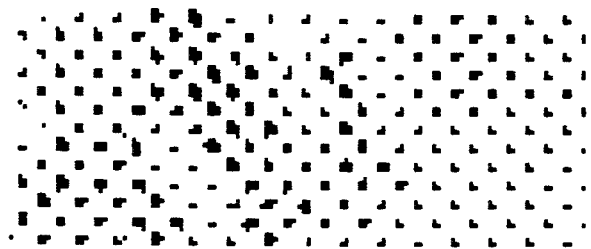
FIG._15B.
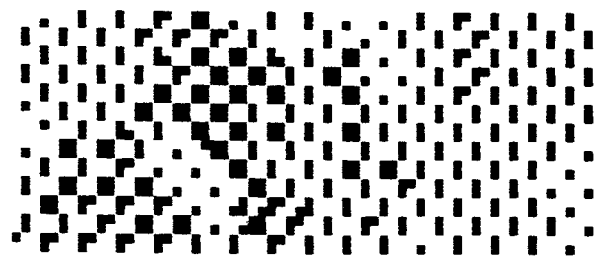
FIG._15C.
FIG._15D.

FIG._16A.
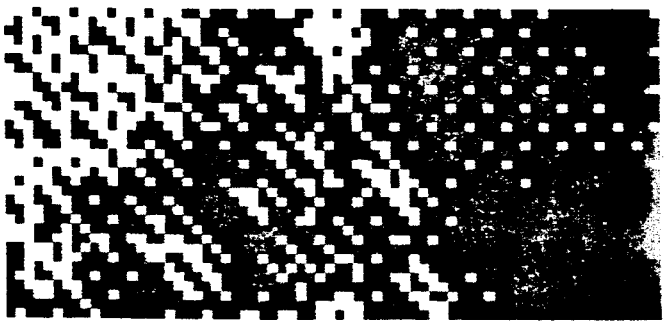
FIG._16B.

FIG._17A.
FIG._17B.
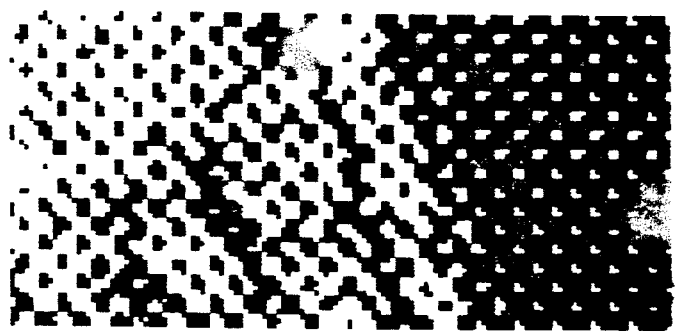
FIG._18A.
FIG._18B.

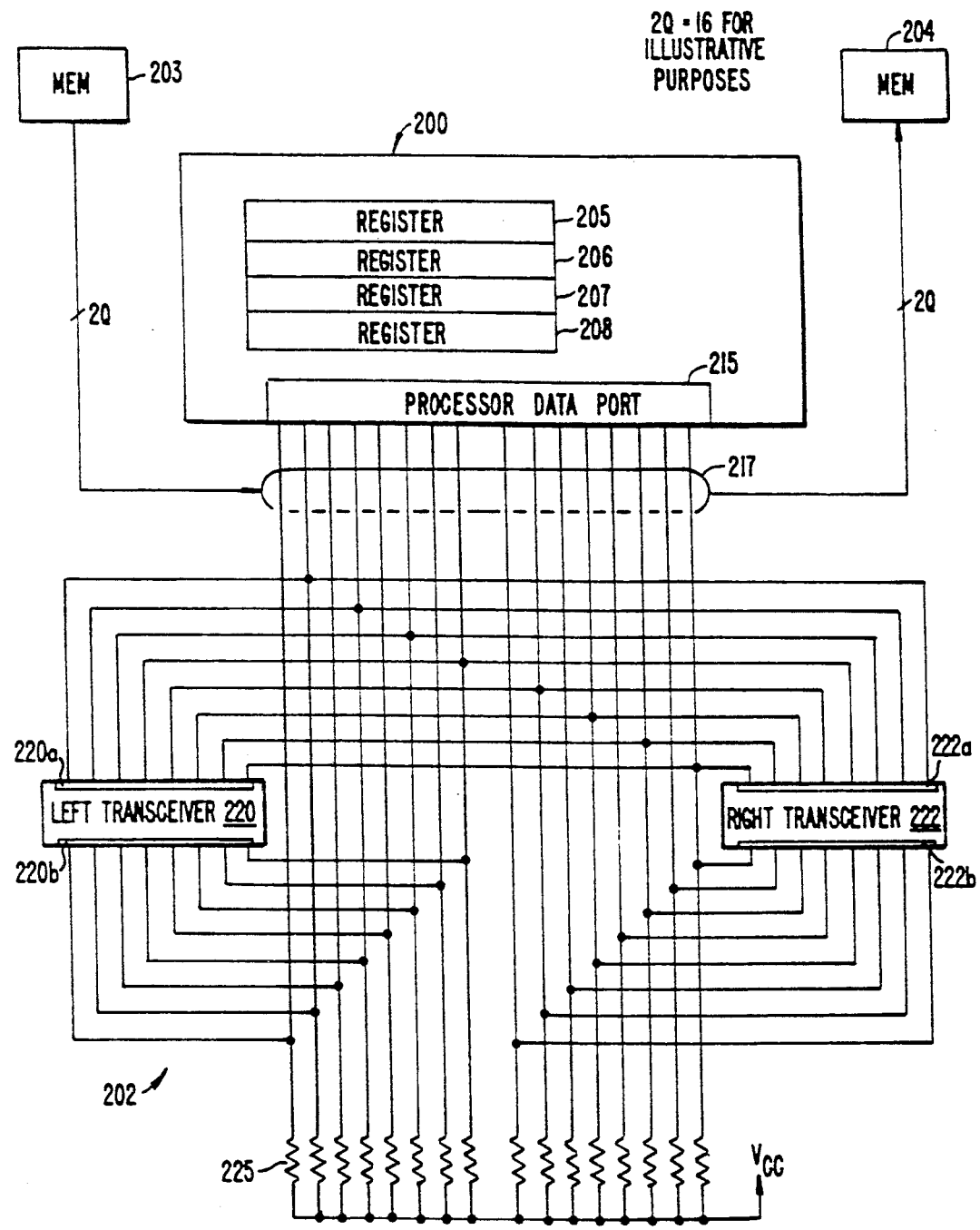
FIG._19.

IDENTIFICATION, CHARACTERIZATION, AND SEGMENTATION OF HALFTONE OR STIPPLED REGIONS OF BINARY IMAGES BY GROWING A SEED TO A CLIPPING MASK

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

The invention relates generally to image processing, and more specifically to a technique for discriminating between finely textured regions and other regions.

There are several applications where it is important to determine quickly whether an image contains regions of fine texture such as halftones and stipples.

For example, problems can arise with printers whose output is at a different resolution from the input scanner, since techniques for converting the resolution are sensitive to texture. A technique that works well on text will generally do poorly on halftones or stipples, and vice versa. If the halftone regions are identified, and if the frequency and screen angle are known, then appropriate techniques can be selected for different portions of the image, and the halftone regions can be resolution converted with an acceptably low level of aliasing artifacts.

Problems also arise for scanners. When scanning a halftoned binary image, beating can occur between the repeat frequency in the image and the size of an integral number of scanned pixels. The result is aliasing, in which a low frequency Moire pattern will be observed in the scanned image. In order to prevent this, it is desirable to use a gray scale scanner, and remove halftoning prior to thresholding. Techniques for removing halftone patterns work best if the halftone frequency and screen angle are known.

It is sometimes necessary for gross segmentation to occur prior to using some segmentation software. Some aspects of segmentation can be accomplished by building a connected component representation of the binary image, such as a line adjacency graph (LAG), and then processing that data structure. However, if one tried to build a LAG from a finely textured screen of appreciable size (say 2 inches square or larger), the storage requirements and computational time might well be excessive. Similarly, it is necessary for segmentation to occur prior to using recognition software. If a halftoned region of a binary image were sent to OCR or graphics vectorization software, it could break the program.

Depending on the threshold setting and resolution of the input scanners, and on the quality of the output printer and number of copy generations, a printed version of the binary image of a regular textured region may show little or none of the details of the texturing of the original binary image. Because of scanning and printing operations, the contrast at the 1–5 line pairs per mm size is often greatly increased, with dark textures becoming solid black, and light textures becoming much lighter or even white (perhaps with some random dot noise). Thus, in many situations, it cannot be assumed that evidence of the original texturing will remain in the binary image under analysis.

SUMMARY OF THE INVENTION

The present invention provides a robust and computationally efficient technique utilizing transformations, such as thresholded reduction operations and morphological operations, for determining the existence of halftone or stippled regions (referred to collectively as halftone regions) in a binary image, characterizing such regions as to screen size and angle, and creating a representation of the halftone regions, such as by creating a separation mask covering the halftone regions or extracting the coordinates of the halftone region boundaries.

Thresholded reductions and morphological operations will be defined and discussed in detail below. A thresholded reduction entails mapping a rectangular array of pixels onto a single pixel, whose value depends on the number of ON pixels in the rectangular array and a threshold level. Morphological operations use a pixel pattern called a structuring element (SE) to erode, dilate open, or close an image.

A preferred technique for determining whether there exist halftone regions includes dividing the image into a number of sub-regions or tiles, extracting and counting pixel transitions in each tile, normalizing the counts to the area, and comparing the values to a threshold value that distinguishes halftone regions from non-halftone regions (such as those containing text and line graphics).

A preferred technique for determining the screen size and angle preferably includes selecting the tile having the largest number of pixel transitions, and filtering the tile, such as by eroding it with a number of hit-miss SE's that act as narrow bandpass filters. The SE's are each characterized by a linear dimension and angle. The SE giving the most ON pixels after erosion of the tile serves to characterize the screen size and angle.

Constructing the separation mask preferably includes constructing a seed image, constructing a clipping mask, and filling the seed while clipping to the mask. The seed must contain pixels only in the halftone regions and must contain at least one pixel in every halftone region. The clipping mask must cover all ON pixels in the halftone regions. It may also cover non-halftone regions, but no part of the clipping mask that covers a non-halftone region should touch a part that covers a halftone region.

The seed may be constructed by eroding the entire image with the SE that was found to give the best match in connection with determining the screen size and angle as mentioned above, performing one or more thresholded reductions, and performing an open operation with a 3×3 or 4×4 solid SE to eliminate pixels outside the halftone regions.

The clipping mask may be constructed by converting the halftone regions to solid ON pixels. This is preferably accomplished by subjecting the entire image to a transformation that tends to eliminate OFF pixels located next to or near ON pixels in a manner that the halftone regions become substantially entirely filled, while the non-halftone regions (such as those containing line graphics and text) become darkened but not completely filled. By way of example, such a transformation may comprise one or more thresholded reductions with general darkening (low threshold level), possibly followed by a close operation.

Filling the seed while clipping to the mask may be accomplished by an iterative procedure wherein the seed (or current iteration thereof) is dilated with a 3×3 solid SE and ANDed with the clipping mask until the result does not change.

The present invention is computationally simple since the operations are essentially local. The invention is also fast. This is in part because the operations entail few computations per pixel, and in part because many of the operations are carried out on reduced images, which contain fewer pixels than the original image, so there are fewer pixels to process.

A further understanding of the nature and advantages of the present invention may be realized by reference to the remaining portions of the specification and the drawings.

BRIEF DESCRIPTION OF THE DRAWINGS

FIG. 1A is a block diagram of an image scanning and processing system incorporating the present invention;

FIG. 1B is a high level flow diagram showing the method of identifying. characterizing, and separating finely textured regions in an image;

FIGS. 2A-B are flow diagrams illustrating the steps in determining whether there are halftones;

FIGS. 4A-D, 5A-C, 6A-D, 7A-B, and 8A-D show the hit-miss SE's that are used as narrow bandpass filters to determine the halftone characteristics;

FIGS. 9A-D are flow diagrams illustrating the creation of a separation mask from a seed and a clipping mask;

FIG. 10 is a flow diagram illustrating the use of the mask to obtain the separation of the textured and non-textured regions;

FIG. 11 is a flow diagram illustrating an alternative to expanding the mask;

FIG. 12 is a flow diagram illustrating an alternative way to create the seed;

FIGS. 13A-B are flow diagrams illustrating alternatives to the thresholded reductions used to create the seed and the clipping mask;

FIG. 14 shows a representative binary image;

FIG. 15A is a plot of filter response for a set of spatial filters;

FIGS. 15B-D show the results at different stages of creating of the seed;

FIGS. 16A-B show the results at different stages of creating the clipping mask;

FIGS. 17A-B show the results of combining the seed and clipping mask to provide a halftone mask;

FIGS. 18A-B show the halftone separation and the text separation; and

FIG. 19 is a block diagram of special purpose hardware for performing image reductions and expansions.

DESCRIPTION OF SPECIFIC EMBODIMENTS

Definitions and Terminology

Figure 3:
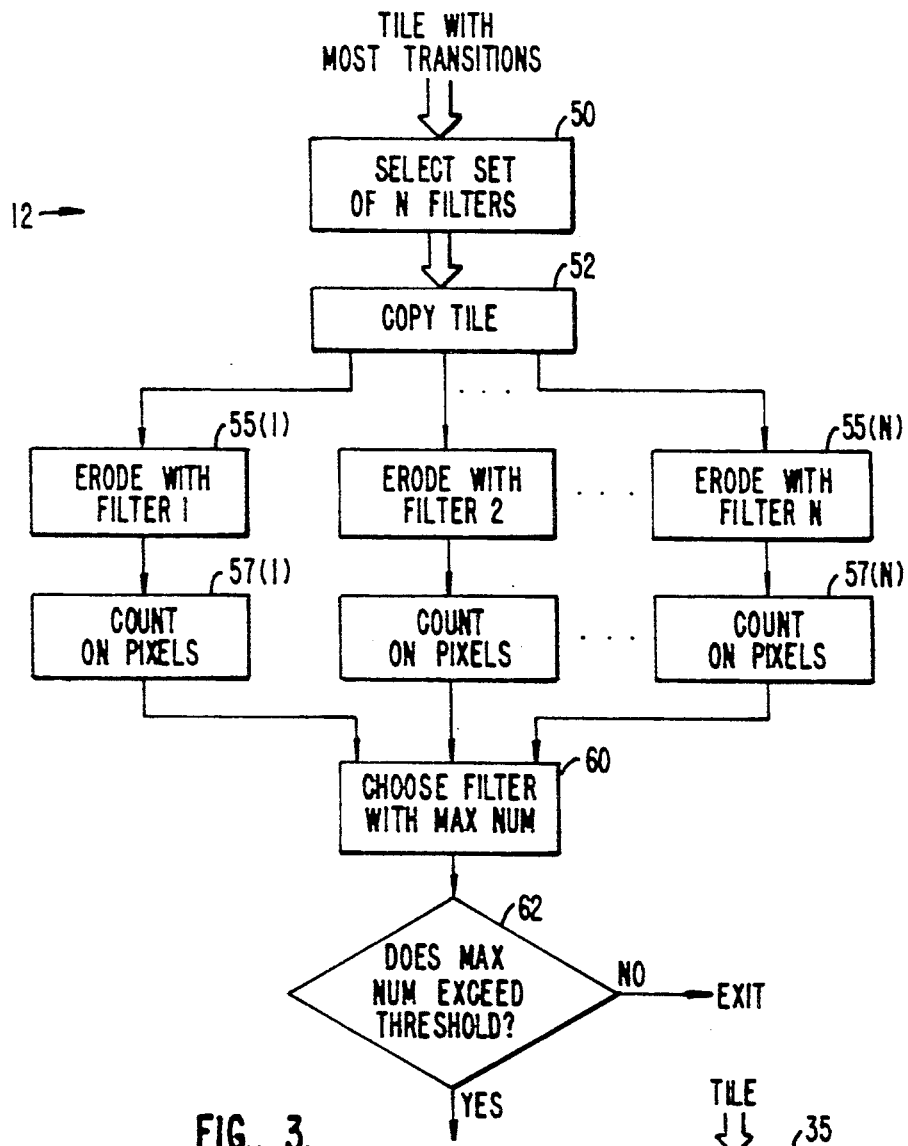
FIG. 3 is a flow diagram illustrating the characterization of the size and angle of the halftone screen.

The present discussion deals with binary images. In this context, the term "image" refers to a representation of a two-dimensional data structure composed of pixels. A binary image is an image where a given pixel is either "ON" or "OFF." Binary images are manipulated according to a number of operations wherein one or more source images are mapped onto a destination image. The results of such operations are generally referred to as images. The image that is the starting point for processing will sometimes be referred to as the original image.

Pixels are defined to be ON if they are black and OFF if they are white. It should be noted that the designation of black as ON and white as OFF reflects the fact that most documents of interest have a black foreground and a white background. While the techniques of the present invention could be applied to negative images as well, the discussion will be in terms of black on white.

A "solid region" of an image refers to a region extending many pixels in both dimensions within which substantially all the pixels are ON.

A "textured region" of an image refers to a region that contains a relatively fine-grained pattern. Examples of textured regions are halftoned or stippled regions.

"Text" refers to portions of a document or image containing letters, numbers, or other symbols including non-alphabetic linguistic characters.

"Line graphics" refers to portions of a document or image composed of graphs, figures, or drawings other than text, generally composed of horizontal, vertical, and skewed lines having substantial run length as compared to text. Graphics could range from, for example, horizontal and vertical lines in an organization chart to more complicated horizontal, vertical, and skewed lines in engineering drawings.

A "mask" refers to an image, normally derived from an original image, that contains substantially solid regions of ON pixels corresponding to regions of interest in the original image. The mask may also contain regions of ON pixels that don't correspond to regions of interest.

AND, OR, and XOR are logical operations carried out between two images on a pixel-by-pixel basis.

NOT is a logical operation carried out on a single image on a pixel-by-pixel basis.

"Expansion" is a scale operation characterized by a SCALE factor N, wherein each pixel in a source image becomes an N×N square of pixels, all having the same value as the original pixel.

"Reduction" is a scale operation characterized by a SCALE factor N and a threshold LEVEL M. Reduction with SCALE=N entails dividing the source image into N×N squares of pixels, mapping each such square in the source image to a single pixel on the destination image. The value for the pixel in the destination image is determined by the threshold LEVEL M, which is a number between 1 and $N^2$. If the number of ON pixels in the pixel square is greater or equal to M, the destination pixel is ON, otherwise it is OFF.

"Subsampling" is an operation wherein the source image is subdivided into smaller (typically square) elements, and each element in the source image is mapped to a smaller element in the destination image. The pixel values for each destination image element are defined by a selected subset of the pixels in the source image element. Typically, subsampling entails mapping to single pixels, with the destination pixel value being the same as a selected pixel from the source image element. The selection may be predetermined (e.g. upper left pixel) or random.

A "4-connected region" is a set of ON pixels wherein each pixel in the set is laterally or vertically adjacent to at least one other pixel in the set.

An "8-connected region" is a set of ON pixels wherein each pixel in the set is laterally, vertically, or diagonally adjacent to at least one other pixel in the set.

A number of morphological operations map a source image onto an equally sized destination image according to a rule defined by a pixel pattern called a structuring element (SE). The SE is defined by a center location and a number of pixel locations, each having a defined value (ON or OFF). Other pixel positions, referred to as "don't care," are ignored. The pixels defining the SE do not have to be adjacent each other. The center location need not be at the geometrical center of the pattern; indeed it need not even be inside the pattern.

A "solid" SE refers to an SE having a periphery within which all pixels are ON. For example, a solid 2×2 SE is a 2×2 square of ON pixels. A solid SE need not be rectangular.

A "hit-miss" SE refers to an SE that specifies at least one ON pixel and at least one OFF pixel.

"Erosion" is a morphological operation wherein a given pixel in the destination image is turned ON if and only if the result of superimposing the SE center on the corresponding pixel location in the source image results in a match between all ON and OFF pixels in the SE and the underlying pixels in the source image.

"Dilation" is a morphological operation wherein a given pixel in the source image being ON causes the SE to be written into the destination image with the SE center at the corresponding location in the destination image. The SE's used for dilation typically have no OFF pixels.

"Opening" is a morphological operation that consists of an erosion followed by a dilation. The result is to replicate the SE in the destination image for each match in the source image.

"Closing" is a morphological operation consisting of a dilation followed by an erosion.

The various operations defined above are sometimes referred to in noun, adjective, and verb forms. For example, references to dilation (noun form) may be in terms of dilating the image or the image being dilated (verb forms) or the image being subjected to a dilation operation (adjective form). No difference in meaning is intended.

System Overview

FIG. 1A is a block diagram of an image analysis system 1 within which the present invention may be embodied. The basic operation of system 1 is to extract or eliminate certain characteristic portions of a document 2. To this end, the system includes a scanner 3 which digitizes the document on a pixel basis, and provides a resultant data structure, typically referred to as an image. Depending on the application, the scanner may provide a binary image (a single bit per pixel) or a gray scale image (a plurality of bits per pixel). The image contains the raw content of the document, to the precision of the resolution of the scanner. The image may be sent to a memory 4 or stored as a file in a file storage unit 5, which may be a disk or other mass storage device.

A processor 6 controls the data flow and performs the image processing. Processor 6 may be a general purpose computer, a special purpose computer optimized for image processing operations, or a combination of a general purpose computer and auxiliary special purpose hardware. If a file storage unit is used, the image is transferred to memory 4 prior to processing. Memory 4 may also be used to store intermediate data structures and possibly a final processed data structure.

The result of the image processing, of which the present invention forms a part, can be a derived image, numerical data (such as coordinates of salient features of the image) or a combination. This information may be communicated to application specific hardware 8, which may be a printer or display, or may be written back to file storage unit 5.

Overview of the Invention

An original binary image may include regions of fine texturing such as stippling or halftoning. Such regions will be referred to as halftone regions. The image may also contain solid white regions, solid black regions, and regions of text and line graphics. Such regions will sometimes referred to as non-halftone regions or other regions.

FIG. 1B is a high level flow diagram showing the major steps in a procedure for identifying, characterizing, and separating halftone or stippled regions in an original binary image. In brief, the technique of the present invention entails subjecting the original binary image to a series of logical, scale, and morphological operations. The original binary image is first processed to determine whether there are halftone regions (step 10), and operation is ceased if there are not. Assuming there are, the image is subjected to a filtering procedure to determine the characteristic size and angle of the halftone screen (step 12). The image is then processed to provide a separation mask that covers the halftone regions and no other regions (step 15). The mask and the original binary image are then combined to provide the separations of the halftone and non-halftone regions, and coordinates of the halftone regions are identified (step 20).

Detailed Discussion of One Embodiment

FIG. 2A is an expanded flow diagram illustrating the steps within step 10 (determining whether there are halftone regions). The image is first divided into a number of sub-regions or tiles (step 22). Each tile must contain many pixels and should be on the order of the smallest expected halftone region. Specifically, the image may be divided into tiles, each of a size of about 100×100 pixels to 250×250 pixels. For each tile, a number is generated that represents the number of pixel transitions in that tile (step 25), and the tile with the maximum number of pixel transitions is selected (step 27).

An excellent way to discriminate between halftone and non-halftone regions is to count the number of transition pixels within a region, and to divide that number by the area of the region. Normalizing to the area of the region takes into account two factors that differentiate non-halftone from halftone regions: texture size for pixel transitions and fill fraction of the textured pattern. On both counts, halftone regions give results that are significantly larger than non-halftone regions, even those containing text, typically allowing an easy determination. A preferred measure for discrimination is to use the number of horizontal pixel transitions (ON→OFF or OFF→ON along the scanline), and to take the ratio of such pixel transitions to the number of 16-bit words in the tile. A region of text typically has a value for this ratio of less than 2.0 and a halftone region is typically greater than 2.5.

Accordingly, once the tile with the maximum number has been selected, that number is normalized and a determination is made whether the normalized pixel transition number exceeds a threshold (step 30). If not, it is assumed there are no halftone regions, and processing stops. If the tile with the maximum number of pixel transitions does exceed the threshold, it is assumed that there are halftone regions and processing continues.

Figure 2B:
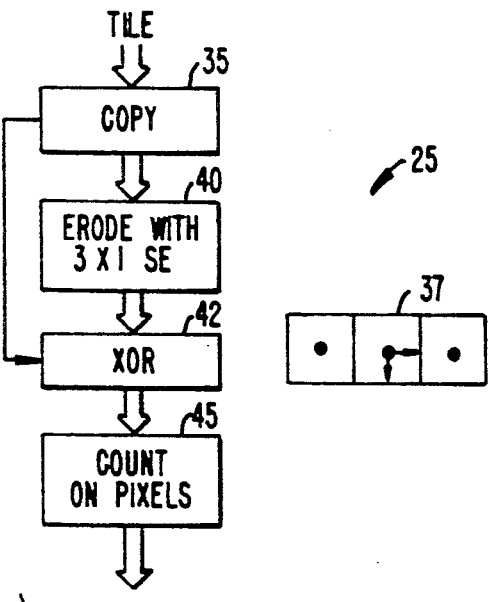

FIG. 2B is a flow diagram illustrating a particular technique for carrying out the counting of horizontal pixel transitions (step 25). The operations in FIG. 2B are carried out for each tile resulting from step 22. The tile is copied (step 35) and one copy reserved. The other copy is eroded (step 40) with a 1×3 horizontal SE 37 having its center at the center position and the result is XORed with the reserved copy (step 42). These operations have the effect of mapping pixel transitions to edge pixels, that is, pixels which are adjacent to a pixel of the opposite color. This technique can slightly undercount pixel transitions, but that is not a significant problem. Alternatively, vertical transitions could be counted by using a 3×1 vertical SE and all edge pixels could be counted using a 3×3 solid SE.

While the above description is phrased in terms of subdividing the image and then processing each tile, the steps of FIG. 2B could be carried out on the entire image, and the result of XOR step 42 could be subdivided and pixels counted in each tile.

FIG. 3 is an expanded flow diagram illustrating the steps within step 12 (determining screen size and angle). Determination of the screen characteristics requires a set of spatial filters that are sensitive to halftone periodicity. These filters, to be described in detail below, are hit-miss SE's, each of which specifies a pattern of both ON and OFF pixels that is to be matched through erosion to the image. A set of N such filters that cover the frequency-angle space of expected printed halftones are selected (step 50) and the tile having the most pixel transitions as determined at step 27 is copied N times (step 52). Each copy is eroded with a respective filter (steps 55(1) . . . 55(N)). The number of ON pixels remaining after erosion is counted for each filter (steps 57(1) . . . 57(N)). The filter that yields the maximum number of ON pixels is selected (step 60), and provides the screen characteristics. As a further check to the actual existence of halftones, the maximum number can be compared to a threshold, and processing stopped if it does not exceed the threshold (step 62).

FIGS. 4A-D, 5A-C, 6A-D, 7A-B, and 8A-D show the hit-miss SE's that are used as narrow bandpass filters to determine the halftone characteristics. Each filter consists of five ON pixels (hits) and four OFF pixels (misses) in a cruciform pattern with the ON pixels at the center and corners of a square and the OFF pixels approximately midway between the center and the corners. These filters have been found empirically to have a spatial period bandwidth of about 0.1 times the period of the repeating pattern and an angle bandwidth of about 15°.

FIG. 9A is a flow diagram illustrating the steps within step 15 (creation of separation mask). The image is copied (step 65), with one copy being used to create a halftone seed (step 67) and the other being used to create a clipping mask (step 70). The halftone seed must contain pixels only in the halftone regions and must contain at least one pixel in every halftone region. The clipping mask must densely cover all ON pixels in the halftone regions. While it may also cover non-halftone regions, no part of the clipping mask that covers a non-halftone region should touch a part of the clipping mask that covers a halftone region.

The seed and the clipping mask are then subjected to a series of operations that causes the seed to grow into the clipping mask (step 72). As will be discussed below, the seed and the clipping mask are generated at reduced scale. Accordingly, if it is desired to make direct use of the mask, the image resulting at step 72 is expanded to original scale (step 75).

FIG. 9B is an expanded flow diagram illustrating the steps within step 67 (creation of halftone seed). The image is first eroded with the best filter chosen at step 60 (step 80) and the result is twice reduced with SCALE=2 and LEVEL=1 (steps 82 and 83). Regions of text and line graphics, to the extent they survived the filtering, are blob-like at this point, but generally have small spatial extent. The image is then subjected to an open operation with a solid 3×3 SE (step 85), which removes any surviving pixels from the non-halftone regions. The result is a seed consisting of ON pixels only in regions corresponding to halftone regions in the original image.

FIG. 9C is an expanded flow diagram illustrating the steps within step 70 (creation of the clipping mask). The original image is subjected to a set of operations that eliminate OFF pixels that are near ON pixels. While text and lines are thickened, they tend to retain their general character. However, as the small dots in the textured regions expand, they coalesce to form large masses and thereby solidify the formerly textured area.

More particularly, the original image is twice reduced with SCALE=2 and LEVEL=1 (steps 90 and 92), which tends to solidify the halftone regions. The result is then optionally subjected to a close operation with a solid 2×2 SE (step 95). The result is a clipping mask which covers all halftone regions (and possibly other regions as well).

FIG. 9D is an expanded flow diagram illustrating the steps within step 72 (growing seed and clipping to mask). The seed, on the first iteration and thereafter an iterated image, is copied (step 100), and one copy reserved for future use. The other copy is dilated with a solid 3×3 SE (step 102), and the result ANDed with the clipping mask (step 105). The dilation tends to fill the seed while the AND operation ensures the seed does not grow beyond the clipping mask. The result of the AND operation is XORed with the reserved copy, to determine whether it has changed since the last iteration (step 107). This is done with an XOR operation, with a result of XOR=0 (no ON pixels) implying that no change has occurred since the last iteration and the seed has filled the mask.

If the images differ, the current, partially filled seed may be copied at step 100 and the sequence continued until the XOR leaves no ON pixels. Alternatively, it may be desirable to stop the process after some number of iterations, say five, even if the image has not stopped changing. This could be the case where the filling activity represents a leak into a non-halftone region of the clipping mask that touches a halftone region inadvertently.

FIG. 10 is an expanded flow diagram illustrating the steps within step 20 (image separation). With the mask thus produced, segmentation is easily accomplished. The original binary image is copied (step 130) and ANDed with the mask (step 135) to produce the "halftone separation" (i.e. the textured part of the image). This is copied (step 137) and the result is subjected to an exclusive OR (step 140) with a copy of the original binary image to produce the non-textured part of the image (text and line graphics). It is noted that the copying steps are not necessary if the result of the logical operation at any given stage is stored in a new array in memory rather than overwriting the operand.

Discussion of Illustrative Alternatives

FIG. 11 is a flow diagram illustrating an alternative to expansion of the solid portions to form the mask. Instead of expanding the solid regions to form the mask, it is possible to extract the coordinates of the solid regions (step 160) and scale the coordinates to full size (step 161). This provides a compact representation that allows convenient storage of the mask information.

The locations of the corners of each solid rectangular portion can be extracted by eroding the copies of the mask with a series of four SE's 162(ULC), 162(URC), 162(LLC), and 162(LRC). SE 162(ULC) is the same as SE 82, and picks out the upper left corner when it is used to erode a rectangle. The other SE's pick out the other corners.

For rectangular regions, it is useful, but not necessary, to extract the corner coordinates in a known order; the coordinates alone dictate the association of corners with rectangular regions. However, for non-rectangular regions, where there are more than four corners for each connected region of the mask (and there may be holes), the corners must be maintained in the order they are encountered by tracing around the periphery. Although possible, this may be sufficiently complicated that it is preferable to use the mask itself.

FIG. 12 is flow diagram illustrating an alternative to the technique of FIG. 9B for creating the halftone seed. The original binary image is twice reduced with SCALE=2 and LEVEL=1 (steps 170 and 172). The result is subjected to an optional close operation (step 175) with a solid 2×2 SE. The result is then twice further reduced with SCALE=2 and LEVEL=4 (steps 177 and 180). The result is then subjected to an OPEN operation with a solid 3×3 SE. It is noted that the seed produced by this sequence of operations is reduced by a factor of 16. Accordingly, the seed must be expanded by a factor of 4 to match the scale of the clipping mask, or the clipping mask must be reduced by a factor of 4.

FIG. 13A is an expanded flow diagram illustrating an alternative to the thresholded reductions with LEVEL=1 used to create the seed and clipping mask. More particularly, the image is dilated with a solid 2×2 SE (step 190) and the resultant image sub-sampled by choosing one pixel in each 2×2 square to form a reduced image (step 192). The sub-sampling may be accomplished on a row basis by discarding every other line, and on the column basis by use of a lookup table in a manner similar to that described below in connection with performing fast thresholded reductions.

FIG. 13B is an expanded flow diagram illustrating an alternative to the thresholded reductions with LEVEL=4 used to create the seed. More particularly, the image is eroded with a solid 2×2 SE (step 195) and the resultant image sub-sampled by choosing one pixel in each 2×2 square to form a reduced image (step 197)

In principle one could also use a series of close operations in an attempt to solidify a finely textured region. However, the use of one or more thresholded reductions (or subsampling) has at least two advantages. First, because the texture scale is not known a priori, it cannot be determined how large an SE to use in the close operation. An SE that is too small to bridge adjacent parts in the textured region would not change the image, and the close operation would fail. Thus, while the use of the close would be locally all or nothing, the use of a reduction with LEVEL=1 (or a dilation and subsampling) invariably results in a darkening of the texture. Second, the use of reductions before close allows the operation to be carried out at a reduced scale. Comparable operations at full scale are much slower computationally than those at a reduced scale (roughly by the third power of the linear scale factor). Therefore, all subsequent operations at reduced scale are much faster.

The selection of a particular size for the SE is empirically based, taking into consideration such factors as scanner resolution. However, the decision tends to be rather straightforward, entailing a minimum amount of experimentation.

Although the thresholded reductions are considered advantageous for creating the clipping mask, the same result is likely to be achieved by doing a dilation with a solid 8×8 SE followed by 8×8 subsampling. However, the computation is likely to take much longer.

Graphical Illustration

FIG. 14 shows a representative binary image scanned at 300 pixels/inch having text and halftone regions. Certain other views of the images at intermediate stages of processing are magnified 2× relative to FIG. 14 References to magnification in the following discussion are relative to FIG. 14 and are not to be confused with the expansion and reduction scale operations.

FIG. 15A is a plot of the filter response (number of ON pixels) resulting from erosion steps 55(1)...55(N) and counting steps 57(1)...57(N) illustrated in FIG. 3. As can be seen from the plot of FIG. 15A, filter number 15 has the greatest response. This filter actually corresponds to the filter of FIG. 8A, which has a spatial period of eight pixels and an angle of 0°.

FIG. 15B shows the result (at 2× magnification) of erosion of the original image with the filter providing the maximum response. FIGS. 15C and 15D show the results (also at 2× magnification) of the two subsequent reductions with SCALE=2 and LEVEL=1. The result is the seed.

FIGS. 16A-B show the results (at 2× magnification) of the two reductions with SCALE=2 and LEVEL=1 carried out on the original image. As can be seen, the effect of the reductions is to cause the small texture elements within the halftone region to coalesce and solidify and to cause the text to thicken. The result is the clipping mask.

FIG. 17A shows the result (at 2× magnification) of filling the seed to the clipping mask. FIG. 17B shows the mask expanded to full size, that is by a linear factor of four corresponding to the two reductions each at SCALE=2. This view is shown at the same scale as the original image.

FIGS. 18A and 18B show the halftone and text separations. The halftone separation of FIG. 18A results from the logical AND of the mask and the original image while the text separation of FIG. 18B results from the exclusive OR of the halftone separation and the original image, as shown in FIG. 10.

Fast Thresholded Reduction (and Expansion) of Images

One requirement of efficient segmentation, is that thresholded reduction must be done quickly. Suppose it is desired to reduce an image by a factor of two in the vertical direction. One way to do this is to use a raster operation (bitblt—bit block transfer) to logically combine the odd and even rows, creating a single row of the reduced image for each pair of rows in the original. The same procedure can then be applied to the columns of the vertically squashed image, giving an image reduced by a factor of two in both directions.

The result, however, depends on the logical operations of the horizontal and vertical raster operations. Obtaining a result with LEVEL=1 or 4 is straightforward. If an OR is used for both raster operation orientations, the result is an ON pixel if any of the four pixels within the corresponding 2×2 square of the original were ON. This is simply a reduction with LEVEL=1. Likewise, if an AND for both raster operation orientations, the result is a reduction with LEVEL=4, where all four pixels must be ON.

A somewhat different approach is used to obtain a reduction with LEVEL=2 or 3. Let the result of doing a horizontal OR followed by a vertical AND be a reduced image R1, and let the result from doing a horizontal AND followed by a vertical OR be a reduced image R2. A reduction with LEVEL=2 is obtained by ORing R1 with R2, and a reduction with LEVEL=3 is obtained by ANDing R1 with R2.

The procedure may not be computationally efficient if implemented as described above. On some computers, such as Sun workstations, raster operations are done in software. The image is stored as a block of sequential data, starting with the first row of the image, moving left-to-right, then the second row, etc. Consequently, the raster operations between rows are fast, because 16 or 32 bits in two words can be combined in one operation. But to perform a raster operation between two columns, the corresponding bits must be found, two bits at a time (one from each column), before the logical operations can be done. It turns out that the time, per pixel, to do the vertical raster operations is at least 25 times greater than the horizontal ones. In fact, when the algorithm is implemented entirely with raster operations, over 90 percent of the time is devoted to the vertical operations.

Fortunately, there is a simple and very fast way to implement the logical operations between columns. Rather than use column raster operations, take 16 sequential bits, corresponding to 16 columns in one row. These 16 bits can be accessed as a short integer. These 16 bits are used as an index into a $2^{16}$-entry array (i.e. a lookup table) of 8-bit objects. The 8-bit contents of the array give the result of ORing the first bit of the index with the second, the third bit with the fourth . . . and on to the 15th bit with the 16th. Actually, two arrays are needed, one for ORing the 8 sets of adjacent columns, and one for ANDing the columns. It should be understood that the numerical example is just that, an example. It is also possible to implement this as a $2^8$-entry array of 4-bit objects, or any one of a number of other ways.

The use of lookup tables to implement column logical operations is about as fast, per pixel, as Sun's row raster operations. A 1000×1000 pixel image can be reduced on a Sun 3/260, with either LEVEL=1 or 4, to a 500×500 pixel image in 0.1 seconds. On a Sun 4/330, the operation takes about 0.04 second.

Special Hardware Configuration

As discussed above, 2×2 reductions require a first logical operation between rows followed by a second, possibly different, logical operation between columns. Moreover, some threshold levels require two intermediate reduced images which are then combined. The table lookup technique for column operations can become cumbersome if it is desired to have a very wide pixelword. Either the table becomes enormous or one needs special techniques of looking up parts of the wide pixelword in multiple parallel tables. The latter, while clearly superior, does require some way to use portions of the data word as memory addresses, which may not otherwise be necessary.

FIG. 19 is a logic schematic of specialized hardware for performing a logical operation between vertically adjacent 2Q-bit pixelwords and a pairwise bit reduction of the resulting 2Q-bit pixelword (bits 0 through 2Q-1). Although the drawing shows a 16-pixel word, the benefits of this hardware would become manifest for much longer pixelwords where the lookup table technique has become cumbersome. A 512-bit pixelword is contemplated, since a line of image would represent only a few pixelwords.

The reduction of the two pixelwords occurs in two stages, designated 200 and 202. In the first stage, a vertically adjacent pair of pixelwords is read from a first memory 203, and the desired first logical operation is carried out between them. The desired second logical operation is then carried out between the resulting pixelword and a version of the pixelword that is shifted by one bit. This provides a processed pixelword having the bits of interest (valid bits) in every other bit position. In the second stage, the valid bits in the processed pixelword are extracted and compressed, and the result stored in a second memory 204. Memory 203 is preferably organized with a word size corresponding to the pixelword size. Memory 204 may be organized the same way.

The preferred implementation for stage 200 is an array of bit-slice processors, such as the IDT 49C402 processor, available from Integrated Device Technology. This specific processor is a 16-bit wide device, each containing 64 shiftable registers. Thirty-two such devices would be suitable for a 512-bit pixelword. For simplification, a 16-bit system with four registers 205, 206, 207, and 208 is shown. Among the processor's operations are those that logically combine the contents of first and second registers, and store the result in the first. The processor has a data port 215, which is coupled to a data bus 217.

Second stage 202 includes first and second latched transceivers 220 and 222, each half as wide as the pixelword. Each transceiver has two ports, designated 220a and 220b for transceiver 220 and 222a and 222b for transceiver 222. Each transceiver is half as wide as the pixelword. Ports 220a and 222a are each coupled to the odd bits of data bus 217, which correspond to the bits of interest. Port 220b is coupled to bits through (Q-1) of the data bus, while port 222b is coupled to bits Q through (2Q−1). The bus lines are pulled up by resistors 125 so that undriven lines are pulled high.

Consider the case of a 2×2 reduction with LEVEL=2. The sequence of operations requires that (a) a vertically adjacent pair of pixelwords be ANDed to form a single 2Q-bit pixelword, adjacent pairs of bits be ORed to form a Q-bit pixelword, and the result be stored; (b) the vertically adjacent pair of pixelwords be ORed, adjacent bits of the resultant 2Q-bit pixelword be ANDed, and the resultant Q-bit pixelword be stored; and (c) the two Q-bit pixelwords be ORed.

To effect this, a pair of vertically adjacent pixelwords are read from first memory 203 onto data bus 217 and into registers 205 and 206. Registers 205 and 206 are ANDed and the result stored in registers 207 and 208. The content of register 208 is shifted one bit to the right, registers 207 and 208 are ORed, and the result is stored in register 208. Registers 205 and 206 are ORed, and the result stored in registers 206 and 207. The content of register 207 is right shifted by one bit, registers 206 and 207 are ANDed, and the result stored in register 207.

At this point, register 207 contains the result of ORing the two pixelwords and ANDing pairs of adjacent bits, while register 208 contains the result of ANDing the pixelwords and ORing pairs of adjacent bits. However, registers 207 and 208 contain the valid bits in the odd bit positions 1, 3, ... (2Q−1). For a reduction with LEVEL=2, registers 207 and 208 are ORed and the result is made available at processor data port 215 which is coupled to data bus 217.

The odd bits of the data bus are latched into transceiver 220 through port 220a, resulting in a Q-bit pixelword with the valid bits in adjacent positions. Although this Q-bit entity could be read back onto the bus and transferred to memory 204, it is preferable to use both latches. Thus, two new pixelwords (horizontally adjacent to the first two) are processed at stage 200 as described above, the result is made available at processor data port 215, and is latched into transceiver 222 through port 222a. The contents of the two transceivers are then read out through ports 220b and 222b onto data bus 217 in order to provide a 2Q-bit pixelword that represents the reduction of four 2Q-bit pixelwords. The result is transferred to second memory 204. This overall sequence continues until all the pixelwords in the pair of rows has been processed. Once the pair of rows has been processed, subsequent pairs are similarly processed.

As mentioned above each bit-slice processor has 64 registers. Accordingly, since memory accesses are more efficient in a block mode, faster operation is likely to result if 8 pairs of pixelwords are read from memory 203 in a block, processed as discussed above, stored in the processor's registers, and written to memory 204 in a block.

Image enlargement is similar, but the steps are executed in the reverse order. First, the processor reads a pixelword and sends the left half through port 220b of transceiver 220. This is read onto the bus through port 220a. Only every other pixel in the resulting word on the bus will initially be valid, so the processor will need to validate all the pixels using a sequence of shifts and logic operations. Since resistors 225 pull up all the bus lines that are not driven, each undriven line, all the even bits in this case, will be 1's. This expanded pixelword, which alternates 1's with valid data, is read into two registers, the content of one register is shifted one place, and the registers are logically ANDed. Everywhere there was a 0 in an odd bit, there will be 00 in an even-/odd pair. None of the other bits will be affected. This pixelword is then written to two vertically adjacent words in the expanded image. This process is repeated for the right half of the pixelword using the transceiver 222. The processor expands the entire row one pixelword at a time and the entire image one row at a time.

Discussion of the Software

A current embodiment of the invention is implemented in software on a digital computer. Appendix 1 (©1988, Unpublished Work, Xerox Corporation) provides a source code program for implementation of this embodiment. The program is in the "C" language, well known to those of skill in the art. The program has been demonstrated on a Sun Workstation, although it will be apparent to those of skill in the art that a wide variety of programming languages and hardware configurations could readily be used based on this disclosure without departing from the scope of the invention.

Appendix 1 was filed with this application and contained 164 pages. The first fourteen pages of Appendix 1 are printed in this patent. The source code for the last 150 pages of Appendix 1 is disclosed at columns 19 through 310 of U.S. Pat. No. 5,065,437, issued Nov. 12, 1991, to Bloomberg. Columns 19 through 310 of the U.S. Pat. No. 5,065,437 are hereby incorporated by reference.

Due to minor printing errors in U.S. Pat. No. 5,065,437, lines 1–30 of columns 221 and 222 appear out of order, and should have been printed immediately following columns 217 and 218. Further a copyright notice identical to that at the top of columns 295 and 296 should have appeared in columns 279 and 280, and in columns 303 and 304.

Conclusion

In conclusion it can be seen that the invention provides efficient and effective separation of textured regions from non-textured regions in an image.

While the above is a complete description of the preferred embodiment of the invention, various modifications are possible. The above discussion of the flexibility of the invention. Furthermore, all the above operations could be done on an image, that is first reduced. Thus, much of the image computation would occur at a further reduced scale. Moreover, while the specific original image illustrated above was derived from a document scanned at 300 pixels/inch, the invention applies to documents scanned at any other resolution.

Therefore the above description and illustrations should not be taken as limiting the scope of the invention, which is defined by the claims.

APPENDIX

/user/bloomberg/print_dir/halftonePatentSourceIl.c

```
/*****************************************************
 * Copyright (c) 1988, Xerox Corporation.  All rights reserved.  *
 * Copyright protection claimed includes all forms and matters   *
 * of copyrightable material and information now allowed by      *
 * statutory or judicial law or hereafter granted, including     *
 * without limitation, material generated from the software      *
 * programs which are displayed on the screen such as icons,     *
 * screen display looks, etc.                                    *
 *****************************************************/
```

```
/*
 * halftoneScripts.c
 */ include <stdio.h>
include <llama.h>
#include <imageReps.h>
#include "alpaca.h"
#include "morph.h"
#include "strelGlobals.h"
#include "graphA.h"

#define  FRACT_HTL_PIX      0.1      /* ratio: Pixels after/Pixels before */
#define  FRACT_HTL_WORDS    0.25     /* ratio: Words after/Words before */
#define  FRACT_TRANS_PIX    0.8      /* ratio: Trans. pixels/Total words */
#define  RATIO_TRANS_TILE   2.5      /* ratio: max trans/words in tile */
#define  RATIO_HT_TILE      0.2      /* ratio: Pixels after/words in tile */
#define  RATIO_HTL_TILE     1.0      /* ratio: Pixels after/words in tile */
#define  FACT_HTL           0.1      /* ratio: Pixels after/Total words */
define  FACT_HT            0.004    /* ratio: Pixels after/Total words */ static char       message[50];

void
segHTScrMenuProc(item, event)
Panel_item      item;
Event           *event;
{
int             selection;
static Menu     segHTScrMenu;
void            segHTScr();

if (!segHTScrMenu)
        segHTScrMenu = menu_create(MENU_STRINGS,
                                   "Halftones or stipples?: trans (PIXELS)",
                                   "Halftones or stipples?: trans/tiling",
                                   "Find best HT filter; if HT, then seg at 16",
                                   "Find best HT filter; if HT, then seg at 8",
                                   "Find best HT filter; if HT, then seg at 4",
                                   "Plot all HT filters, using full image",
                                   "Plot all HTL filters, using full image",
                                   "Plot all HT filters, using trans/tiling",
                                   "Plot all HTL filters, using trans/tiling", 0,
                                   0);

selection = (int) menu_show(segHTScrMenu, mainControlPanel, event, 0);
    segHTScr(item, selection, event);
}
/*
 * segHTScr():  scripts for identifying the existence, type, and location
 *              of halftone screens.
 */
void
segHTScr(segHTScrItem, selection, event)
Panel_item          segHTScrItem;
int                 selection;
Event               *event;
{
```

```
int             i, origFactor;
int             halftone;
STREL           *bestFilt;
PRTILE          *HTTransTileTest(), *destroyTile();

if (!selection)
        return;

if (!pr1)
    {
        printf(" Error in segHTScr: no source pixrect\n");
        return;
    } switch (selection)
    {   /* choose example */
    case 1:  /* use # pixels from transitions: halftones or stipples? */
        HTTransTest(pr1, pr6);   /* test on pr1 */
        break;
    case 2:  /* use # pixels from transitions in tile: HT or stipples? */
        Prtile1 = HTTransTileTest(pr1, 10, 10, TRUE);   /* test on pr1 */
        break;
    case 3:  /* find the best HT filter and use it to obtain the
              * halftone/stipple area as a rectangular mask
              * at 16x16 reduction, using the HTL filters:
              *     choose the best HTL filter;
              *     genHalftoneMask2();
              *     count regions; AND with original, etc... */
        /* start from top level if scaleFactor not 1 or 2 */
        if (scaleFactor >= 4)
        {
            scaleFactor = 1;
            moveToSF(scaleFactor);
        }
        origFactor = scaleFactor;
        setAllSelectedCanvases(0);   /* initialize */

/* decide if halftones are present, and select best HT filter */
        halftone = HTTest(pr1, FALSE);   /* no graphics */
        if (!halftone)
            return;

genHalftoneMask2(origFactor);

/* Construct: original in 1, halftones in 3, non-halftones
         *    in 2, mask-over-original in 5, mask in 6. */
        /* AND the original with the mask: halftone separation to pw3 */
        opPrPr(pr3, pr6, COPY);
        opPrPr(pr3, pr1, INTERSECTION);
        opPrPw(pw3, pr3, COPY);
            /* XOR the original with the halftone separation:
             * other stuff to pw2 */
        logOp(pr2, pr1, pr3, XOR);
        opPrPw(pw2, pr2, COPY);
            /* XOR the original with the mask: mask over original to pw5 */
        logOp(pr5, pr1, pr6, XOR);
        opPrPw(pw5, pr5, COPY);
        break;
    case 4:  /* find the best HT filter and use it to obtain the
```

```
         * halftone/stipple area as a rectangular mask
         * at 8x8 reduction, using the HTL filters:
         *     choose the best HTL filter;
         *     genHalftoneMask3();
         *     count regions; AND with original, etc... */
        /* start from top level if scaleFactor not 1 or 2 */
        if (scaleFactor >= 4)
        {
            scaleFactor = 1;
            moveToSF(scaleFactor);
        }
        origFactor = scaleFactor;
        setAllSelectedCanvases(0);    /* initialize */

/* decide if halftones are present, and select best HT filter */
        halftone = HTTest(pr1, FALSE);   /* no graphics */
        if (!halftone)
            return;

genHalftoneMask3(origFactor);

/* Construct: original in 1, halftones in 3, non-halftones
          *    in 2, mask-over-original in 5, mask in 6. */
         /* AND the original with the mask: halftone separation to pw3 */
        opPrPr(pr3, pr6, COPY);
        opPrPr(pr3, pr1, INTERSECTION);
        opPrPw(pw3, pr3, COPY);
         /* XOR the original with the halftone separation:
          *    other stuff to pw2 */
        logOp(pr2, pr1, pr3, XOR);
        opPrPw(pw2, pr2, COPY);
         /* XOR the original with the mask: mask over original to pw5 */
        logOp(pr5, pr1, pr6, XOR);
        opPrPw(pw5, pr5, COPY);
        break;
case 5:  /* find the best HT filter and use it to obtain the
         * halftone/stipple area as a rectangular mask
         * at 4x4 reduction, using the HTL filters:
         *     choose the best HTL filter;
         *     genHalftoneMask4();
         *     count regions; AND with original, etc... */
        /* start from top level if scaleFactor not 1 or 2 */
        if (scaleFactor >= 4)
        {
            scaleFactor = 1;
            moveToSF(scaleFactor);
        }
        origFactor = scaleFactor;
        setAllSelectedCanvases(0);    /* initialize */

/* decide if halftones are present, and select best HT filter */
        halftone = HTTest(pr1, FALSE);   /* no graphics */
        if (!halftone)
            return;

genHalftoneMask4(origFactor);

/* Construct: original in 1, halftones in 3, non-halftones
          *    in 2, mask-over-original in 5, mask in 6. */
```

```
        /* AND the original with the mask: halftone separation to pw3 */
    opPrPr(pr3, pr6, COPY);
    opPrPr(pr3, pr1, INTERSECTION);
    opPrPw(pw3, pr3, COPY);
        /* XOR the original with the halftone separation:
         *    other stuff to pw2 */
    logOp(pr2, pr1, pr3, XOR);
    opPrPw(pw2, pr2, COPY);
        /* XOR the original with the mask: mask over original to pw5 */
    logOp(pr5, pr1, pr6, XOR);
    opPrPw(pw5, pr5, COPY);
    break;
case 6:  /* find number of words with ON pixels after each
          *    narrow bandpass filter;
          *    set chosenFilt to the best filter */
    clearPw(pw6);
    halftone = applyFiltersToPr(pr1, HTFiltArray, N_HT_FILT,
            WORDS, FACT_HT, TRUE);

if (halftone)
        strcpy(message, " Halftones or stipples detected\n");
      else
        strcpy(message, " No halftone or stipple pattern\n");
    textsw_insert(mainTextSw, message, strlen(message));
    break;
case 7:  /* find number of words with ON pixels after each
          *    wide bandpass filter;
          *    set chosenFilt to the best filter */
    clearPw(pw6);
    halftone = applyFiltersToPr(pr1, HTLFiltArray, N_HTL_FILT,
            WORDS, FACT_HTL, TRUE);

if (halftone)
        strcpy(message, " Halftones or stipples detected\n");
      else
        strcpy(message, " No halftone or stipple pattern\n");
    textsw_insert(mainTextSw, message, strlen(message));
    break;
case 8:  /* use tiles to determine if there are halftones,
          *  to find the best narrow bandpass halftone filter;
          *  and to set chosenFilt to point to that filter. */
    Prtile1 = HTTransTileTest(pr1, 10, 10, TRUE);  /* test on pr1 */
    if (!Prtile1)
        return;
/*  if (!Prtile1->halftones)
        return;  */

/* graph the response of the best tile to narrow bandpass filters */
    clearPw(pw6);
    applyFiltersToPr(Prtile1->best, HTFiltArray, N_HT_FILT,
            PIXELS, RATIO_HT_TILE, TRUE);
    Prtile1 = destroyTile(Prtile1);
    break;
case 9:  /* use tiles to determine if there are halftones,
          *  to find the best wide bandpass halftone filter;
          *  and to set chosenFilt to point to that filter. */
    Prtile1 = HTTransTileTest(pr1, 10, 10, TRUE);  /* test on pr1 */
    if (!Prtile1)
        return;
```

```
/*      if (!Prtile1->halftones)
            return;  */

/* graph the response of the best tile to narrow bandpass filters */
    clearPw(pw6);
    applyFiltersToPr(Prtile1->best, HTLFiltArray, N_HTL_FILT,
            PIXELS, RATIO_HTL_TILE, TRUE);
    Prtile1 = destroyTile(Prtile1);
        break;
    default:
        printf(" Error in segHTScr: unknown selection\n");
    }
}

/*
 * HTTest():  tests whether an image has any halftones in it.
 *            takes a pixrect;
 *            takes an optional flag for graphic display;
 *            returns 0 if no halftones; 1 if there are halftones
 */
HTTest(pixr, graphFlag)
Pixrect         *pixr;
int             graphFlag;
{
int             halftone;
PRTILE          *prtile, *HTTransTileTest(), *destroyTile();
static char     procName[] = "HTTest";

if (!isPrDefined(pixr, procName))
        return;

/* decide if halftones are present, and select best HTL filter */
    prtile = HTTransTileTest(pixr, 10, 10, graphFlag);  /* test on pr1 */
    if (!prtile)
        return 0;

clearPw(pw6);
    halftone = applyFiltersToPr(prtile->best, HTFiltArray, N_HT_FILT,
            PIXELS, RATIO_HT_TILE, graphFlag);
    prtile = destroyTile(prtile);

return (halftone);
}

/*
 * HTFilterTest():  tests image against a particular filter;
 *                  type is either PIXELS or WORDS;
 *                  returns 1 if the image contains halftones,
 *                      0 otherwise.
 *                  if the image contains halftones, sets chosenFilt to
 *                      the best filter.
 */
HTFilterTest(pixr, pixrT, filter, type)
Pixrect         *pixr, *pixrT;
STREL           *filter;
int             type;
{
```

```
int         i, numOnBefore, numOnAfter, numThreshold;
double      fraction, ratio;
static char procName[] = "HTFilterTest";

if (!isPrDefined(pixr, procName))
        return;
    if (!isPrDefined(pixrT, procName))
        return;

if (!filter)
    {
        printf(" Error in HTFilterTest: filter does not exist\n");
        return 0;
    } numOnBefore = numberPr(pixr, type);
    erode(pixrT, pixr, filter);
    numOnAfter = numberPr(pixrT, type);
    ratio = (double) numOnAfter / (double) numOnBefore;
    if (type == PIXELS)
        sprintf(message, " %d ON pixels after filter; ratio %f\n",
                numOnAfter, ratio);
    else
        sprintf(message, " %d ON words after filter; ratio %f\n",
                numOnAfter, ratio);
    textsw_insert(mainTextSw, message, strlen(message));

if (type == PIXELS)
        fraction = FRACT_HTL_PIX;
    else    /* WORDS */
        fraction = FRACT_HTL_WORDS;
    numThreshold = fraction * numOnBefore;
    sprintf(message, " numOnAfter = %d, numThreshold = %d\n",
                numOnAfter, numThreshold);
    textsw_insert(mainTextSw, message, strlen(message));
    if (numOnAfter > numThreshold)
    {
        strcpy(message, " Halftones or stipples detected\n");
        textsw_insert(mainTextSw, message, strlen(message));
        return 1;
    }
    else
    {
        strcpy(message, " No halftone or stipple pattern\n");
        textsw_insert(mainTextSw, message, strlen(message));
        return 0;
    }
}

/*
 * HTTransTest():   tests image for halftones by comparing the
 *                      number of PIXEL transitions with the
 *                      number of words in the imaage.
 *                  returns 1 if the image contains halftones,
 *                      0 otherwise.
 *                  if the image contains halftones, sets chosenFilt to
 *                      the best filter.
```

```
*    Note:      I have tried to use the ratio of transition PIXELS to ON
*               pixels or ON words, but neither works well.  Likewise,
*               the ratio of the transition WORDS to ON pixels or ON words
*               doesn't work well either.
*/
HTTransTest(pixr, pixrT)
Pixrect      *pixr, *pixrT;
{
int          i, numWords, numOnAfter, numThreshold;
double       ratio;
static char  procName[] = "HTTransTest";

if (!isPrDefined(pixr, procName))
        return;
    if (!isPrDefined(pixrT, procName))
        return;

numWords = (pixr->pr_size.x >> 4) * pixr->pr_size.y;
        /* horizontal transitions to pixrT */
    erode(pixrT, pixr, strel3h);
    opPrPr(pixrT, pixr, XOR);
    numOnAfter = numberPr(pixrT, PIXELS);
    ratio = (double) numOnAfter / (double) numWords;
    sprintf(message, " %d pixels with ON transitions; ratio %f\n",
            numOnAfter, ratio);
    textsw_insert(mainTextSw, message, strlen(message));

numThreshold = FRACT_TRANS_PIX * numWords;
    sprintf(message, " numOnAfter = %d, numThreshold = %d\n",
            numOnAfter, numThreshold);
    textsw_insert(mainTextSw, message, strlen(message));
    if (numOnAfter > numThreshold)
    {
        strcpy(message, " Halftones or stipples detected\n");
        textsw_insert(mainTextSw, message, strlen(message));
        return 1;
    }
    else
    {
        strcpy(message, " No halftone or stipple pattern\n");
        textsw_insert(mainTextSw, message, strlen(message));
        return 0;
    }
}

/*
*  HTTransTileTest():    tests image for halftones by comparing the
*                        number of PIXEL transitions with the
*                        number of words in the imaage.
*                        optionally graphs the response of each tile.
*                        returns the PRTILE data structure.
*                        the existence of halftones can be determined
*                        from members of the PRTILE structure.
*/
PRTILE *
HTTransTileTest(pixr, nx, ny, graphFlag)
Pixrect      *pixr;
int          nx, ny, graphFlag;
```

```
{
int         numWords, numOnAfter, maxNumAfter, numThreshold;
int         w, h, i, j, index;
Pixrect     ***tile, *pixrT;
PRTILE      *prtile, *createTile();
double      ratio, maxratio;
DATA        *data, *graphInit();
static char procName[] = "HTTransTileTest";

if (!isPrDefined(pixr, procName))
        return NULL;

prtile = createTile(pixr, nx, ny);
    if (!prtile)
        return NULL;

if (graphFlag)
    {
        data = graphInit();
        graphPutTitle(data, "Transitions in each tile");
    }
    w = prtile->w;
    h = prtile->h;
    tile = prtile->tile;
    pixrT = mem_create(w, h, 1);
        /* number of 16-bit words in each tile */
    numWords = (pixr->pr_size.x * pixr->pr_size.y) / (16 * nx * ny);

/* horizontal transitions to pixrT */
    maxratio = 0.;
    maxNumAfter = 0;
    index = 0;
    for (i = 0; i < ny; i++)
        for (j = 0; j < nx; j++)
        {
            erode(pixrT, tile[i][j], strel3h);
            opPrPr(pixrT, tile[i][j], XOR);
            numOnAfter = numberPr(pixrT, PIXELS);
            if (graphFlag)
                graphPutData(data, index, numOnAfter);
            if (numOnAfter > maxNumAfter)
            {
                maxNumAfter = numOnAfter;
                prtile->best = tile[i][j];
                prtile->i = i;
                prtile->j = j;
            }
            ratio = (double) numOnAfter / (double) numWords;
            maxratio = Max(maxratio, ratio);
            index++;
        }
    if (graphFlag)
        graphMake(data);

numThreshold = RATIO_TRANS_TILE * numWords;
    if (maxNumAfter > numThreshold)
    {
        prtile->halftones = TRUE;
        printf("Transitions: Halftones or stipples detected\n");
```

```
        strcpy(message, "Transitions:  Halftones or stipples detected\n");
        textsw_insert(mainTextSw, message, strlen(message));
    }
    else
    {
        prtile->halftones = FALSE;
        printf("Transitions:  No halftone or stipple pattern\n");
        strcpy(message, "Transitions:  No halftone or stipple pattern\n");
        textsw_insert(mainTextSw, message, strlen(message));
    }
    printf("   Maximum ratio is %f:\n", maxratio);
    printf("      maxNumAfter = %d, numThreshold = %d\n",
            maxNumAfter, numThreshold);
    sprintf(message, " maxNumAfter = %d, numThreshold = %d\n",
            maxNumAfter, numThreshold);
    textsw_insert(mainTextSw, message, strlen(message));

return (prtile);
}

/*
 * applyFiltersToPr():   takes a pixrect, an array of halftone filters,
 *                       the number of filters in the array, the
 *                       type of item counted (either PIXELS or WORDS), and
 *                       the threshold ratio of ON pixels after erosion
 *                       to 16-bit words that indicates the existence
 *                       of halftones.
 *                       if graphFlag == TRUE, graphs the response to each
 *                       filter.
 *                       returns 1 if halftones are detected;
 *                       0 otherwise or on error.
 */
applyFiltersToPr(pixr, filtArray, numFilts, type, threshRatio, graphFlag)
Pixrect         *pixr;
STREL           **filtArray;
int             numFilts, type, graphFlag;
double          threshRatio;
{
DATA            *data, *graphInit();
int             numMax, numOn, numThreshold, w, h, i;
Pixrect         *pixrT;
STREL           *bestFilt;
static char     procName[] = "applyFiltersToPr";

if (!isPrDefined(pixr, procName))
        return 0;

if (!filtArray)
    {
        printf(" Error in applyFiltersToPr: filtArray not defined\n");
        return 0;
    } if (graphFlag)
    {
        data = graphInit();
    graphPutTitle(data, "Number of ON-pixels after each filter");
}
```

```
    w = pixr->pr_size.x;
    h = pixr->pr_size.y;
    pixrT = mem_create(w, h, 1);
    numMax = 0;
    for (i = 0; i < numFilts; i++)
        if (filtArray[i])
        {
            erode(pixrT, pixr, filtArray[i]);
            opPrPw(pw6, pixrT, COPY);
            numOn = numberPr(pixrT, type);
            if (graphFlag)
                graphPutData(data, i, numOn);
            if (numOn > numMax)
            {
                bestFilt = filtArray[i];
                numMax = numOn;
            }
        }
    if (graphFlag)
        graphMake(data);
    chosenFilt = bestFilt;
    pr_close(pixrT);

/* determine if there are halftones */
    numThreshold = (int)(threshRatio * (w * h / 16));
    if (numMax < numThreshold)
        printf("HT Filters:  No halftone or stipple pattern\n");
      else
        printf("HT Filters:  Halftones or stipples detected\n");

printf("  numMax = %d, numThreshold = %d\n",
            numMax, numThreshold);

if (numMax < numThreshold)
        return 0;
      else
        return 1;
}

/*
 *  genHalftoneMask2():  obtain the halftone/stipple area as a solid
 *                       rectangular mask at some reduced level:
 *          make mask: REDUCE (LEVEL=1) to SCALE=8; REDUCE (LEVEL=4)
 *              to SCALE=16; CLOSE 2;
 *          make seed: erode with bestFilt; REDUCE (LEVEL=1) to
 *              SCALE=4; CLOSE 2; REDUCE (LEVEL=4) to SCALE=16;
 *              OPEN 2;
 *          fillClip8 (completion);
 *          EXPAND to SCALE=8; DILATE 3 to resize mask;
 *              EXPAND to SCALE=1;
 */
genHalftoneMask2(origFactor)
int         origFactor;
{
int         numRegions;
BOXES       *maskToBoxes(), *xformBoxes();
POLYS       *maskToPolys();
```

```
    /* use LEVEL=1 reduction to SCALE=8, LEVEL=4 reduction
     *    to SCALE=16, and CLOSE 2; then return to factor=orig
     *    The clipping image is now in pr3 */
opPrPr(pr3, pr1, COPY);
opPrPw(pw3, pr3, COPY);
togSelectedCanvases(3);
selectiveReduce(1);
selectiveReduce(1);
selectiveReduce(1);
selectiveReduce(4);
togSelectedCanvases(3);
closePr(pr4, pr3, strel2);
opPrPr(pr3, pr4, COPY);
opPrPw(pw3, pr3, COPY);   /* show it */
scaleFactor = origFactor;
moveToSF(origFactor);
    /* ERODE with bestFilt */
erode(pr2, pr1, chosenFilt);
opPrPw(pw2, pr2, COPY);   /* show it */
    /* use level=1 reduction to factor = 4: solidify halftones */
togSelectedCanvases(2);
selectiveReduce(1);
selectiveReduce(1);
togSelectedCanvases(2);
    /* close pr2; result to pw1: solidify halftones */
closePr(pr1, pr2, strel2);
opPrPw(pw1, pr1, COPY);   /* show it */
    /* reduce with level=4 to factor = 16: weaken noise */
togSelectedCanvases(1);
selectiveReduce(4);
selectiveReduce(4);
togSelectedCanvases(1);
    /* open to pw2: complete the removal of text/graphics noise
     *    The seed is now in pr2 */
openPr(pr2, pr1, strel2);
opPrPw(pw2, pr2, COPY);   /* show it */
    /* fillClip to completion (max 20 iter); result to pw4 */
fillClip(pr4, pr2, pr3, TO_COMPLETION, 20);
opPrPw(pw4, pr4, COPY);   /* show it */
    /* expand to factor = 8: need to resize with symmetric
     *    -strel3 at this factor */
togSelectedCanvases(4);
selectiveExpand(TRUE, 1);
togSelectedCanvases(4);
    /* dilate; to pw5: final resize of mask before expansion */
dilate(pr5, pr4, strel3);
opPrPw(pw5, pr5, COPY);   /* show it */
    /* determine the number of halftone regions */
Polys1 = maskToPolys(pr5, scaleFactor);
numRegions = Polys1->n;
sprintf(message, "\n Number of regions = %d\n", numRegions);
Boxes1 = maskToBoxes(pr5);
Boxes2 = xformBoxes(Boxes1, 0, 0, 8);
Boxes3 = xformBoxes(Boxes2, -totBorderLeftTop, -totBorderLeftTop, 1);
printBoxes(Boxes3);
    /* copy to pw6 and expand to factor = 1 */
opPrPw(pw6, pr5, COPY);
togSelectedCanvases(6);
selectiveExpand(FALSE, origFactor);
```

```
    togSelectedCanvases(6);
    textsw_insert(mainTextSw, message, strlen(message));
}

/*
 *   genHalftoneMask3():  obtain the halftone/stipple area as a solid
 *                        rectangular mask at an 8x8 reduced level.
 *        make mask: REDUCE (LEVEL=1) to SCALE=8;
 *        make seed: erode with bestFilt; REDUCE (LEVEL=1) to
 *            SCALE=4; CLOSE 2; REDUCE (LEVEL=4) to SCALE=8;
 *            OPEN 2;
 *        fillClip8 (completion);
 *        EXPAND to SCALE=1;
 */
genHalftoneMask3(origFactor)
int            origFactor;
{
int            numRegions;
BOXES          *maskToBoxes(), *xformBoxes();

/* use LEVEL=1 reduction to SCALE=8;
         *   then return to factor=orig.
         *   The clipping image is now in pr3 */
    opPrPr(pr3, pr1, COPY);
    opPrPw(pw3, pr3, COPY);
    togSelectedCanvases(3);
    selectiveReduce(1);
    selectiveReduce(1);
    selectiveReduce(1);
    togSelectedCanvases(3);
    opPrPw(pw3, pr3, COPY);  /* show it */
    scaleFactor = origFactor;
    moveToSF(origFactor);
        /* ERODE with bestFilt */
    erode(pr2, pr1, chosenFilt);
    opPrPw(pw2, pr2, COPY);  /* show it */
        /* use level=1 reduction to factor = 4: solidify halftones */
    togSelectedCanvases(2);
    selectiveReduce(1);
    selectiveReduce(1);
    togSelectedCanvases(2);
        /* close pr2 (solidify halftones); open pr1 (remove noise)
         * result to pr2 */
    closePr(pr1, pr2, strel2);
    openPr(pr2, pr1, strel2);
    opPrPw(pw2, pr2, COPY);  /* show it */
        /* reduce with level=2; the seed is now in pr2  */
    togSelectedCanvases(2);
    selectiveReduce(2);
    togSelectedCanvases(2);
        /* fillClip to completion (max 10 iter); result to pw4 */
    fillClip(pr4, pr2, pr3, TO_COMPLETION, 10);
    opPrPw(pw4, pr4, COPY);  /* show it */
        /* determine the number of halftone regions */
    togSelectedCanvases(4);
    selectiveReduce(1);
    togSelectedCanvases(4);
    fill8(pr5, pr4, TO_COMPLETION, 10);
    Boxes1 = maskToBoxes(pr5);
```

```
    numRegions = Boxes1->n;
    sprintf(message, "\n Number of regions = %d\n", numRegions);
    Boxes2 = xformBoxes(Boxes1, 0, 0, 16);
    Boxes3 = xformBoxes(Boxes2, -totBorderLeftTop, -totBorderLeftTop, 1);
    printBoxes(Boxes3);
    moveToSF(8 * origFactor);
        /* copy to pw6 and expand to factor = 1 */
    opPrPw(pw6, pr4, COPY);
    togSelectedCanvases(6);
    selectiveExpand(FALSE, origFactor);
    togSelectedCanvases(6);
    textsw_insert(mainTextSw, message, strlen(message));
}

/*
 *  genHalftoneMask4():   obtain the halftone/stipple area as a solid
 *                        rectangular mask at a 4x4 reduced level.
 *          make mask: REDUCE (LEVEL=1) to SCALE=4;
 *          make seed: erode with bestFilt; REDUCE (LEVEL=1) to
 *              SCALE=4; CLOSE 2; OPEN 4;
 *          fillClip8 (completion);
 *          EXPAND to SCALE=1;
 */
genHalftoneMask4(origFactor)
int         origFactor;
{
int         numRegions;
BOXES       *maskToBoxes(), *xformBoxes();

/* use LEVEL=1 reduction to SCALE=4;
         *    then return to factor=orig.
         *    The clipping image is now in pr3 */
    opPrPr(pr3, pr1, COPY);
    opPrPw(pw3, pr3, COPY);
    togSelectedCanvases(3);
    selectiveReduce(1);
    selectiveReduce(1);
    togSelectedCanvases(3);
    opPrPw(pw3, pr3, COPY);   /* show it */
    scaleFactor = origFactor;
    moveToSF(origFactor);
        /* ERODE with bestFilt */
    erode(pr2, pr1, chosenFilt);
    opPrPw(pw2, pr2, COPY);   /* show it */
        /* use level=1 reduction to factor = 4: solidify halftones */
    togSelectedCanvases(2);
    selectiveReduce(1);
    selectiveReduce(1);
    togSelectedCanvases(2);
        /* close pr2 (solidify halftones); open pr1 (remove noise);
         *    the seed is put in pr2 */
    closePr(pr1, pr2, strel2);
    openPr(pr2, pr1, strel2);
    opPrPw(pw2, pr2, COPY);   /* show it */
        /* fillClip to completion (max 10 iter); result to pw4 */
    fillClip(pr4, pr2, pr3, TO_COMPLETION, 10);
    opPrPw(pw4, pr4, COPY);   /* show it */
        /* determine the number of halftone regions */
    togSelectedCanvases(4);
```

```
    selectiveReduce(1);
    selectiveReduce(1);
    togSelectedCanvases(4);
    fill8(pr5, pr4, TO_COMPLETION, 10);
    Boxes1 = maskToBoxes(pr5);
    numRegions = Boxes1->n;
    sprintf(message, "\n Number of regions = %d\n", numRegions);
    Boxes2 = xformBoxes(Boxes1, 0, 0, 16);
    Boxes3 = xformBoxes(Boxes2, -totBorderLeftTop, -totBorderLeftTop, 1);
    printBoxes(Boxes3);
    moveToSF(4 * origFactor);
        /* copy to pw6 and expand to factor = 1 */
    opPrPw(pw6, pr4, COPY);
    togSelectedCanvases(6);
    selectiveExpand(FALSE, origFactor);
    togSelectedCanvases(6);
    textsw_insert(mainTextSw, message, strlen(message));
}
```

What is claimed is:

1. A method performed in a digital processor for identifying and processing halftone regions in a binary input image, comprising the steps of:
  determining whether halftone regions exist in the input image; and
  only if halftone regions exist, constructing a representation of a separation mask by performing the sub-steps of
  constructing a seed,
  constructing a clipping mask, and
  growing the seed and clipping the seed, thus grown, to the clipping mask.

2. A method performed in a digital processor for processing halftone regions in an original binary image, comprising the steps of:
  subjecting the input image to at least one thresholded reduction at a low threshold value to provide a resulting image;
  subjecting the resulting image to at least one thresholded reduction at a high threshold level to provide a further resulting image;
  subjecting the further resulting image to an open operation to provide a seed;
  constructing a clipping mask; and
  growing the seed and clipping the seed, thus grown, to the clipping mask.

3. A method performed in a digital processor for processing halftone regions in binary input image, comprising the steps of:
  constructing a seed;
  constructing a clipping mask; and
  growing the seed and clipping the seed, thus grown, to the clipping mask;
  wherein said step of constructing a clipping mask comprises subjecting the image to a set of operations that eliminates OFF pixels that are near ON pixels, said set of operations including at least one thresholded reduction to solidify textured areas.

4. A method performed in a digital processor for processing halftone regions in a binary input image, comprising the steps of:
  processing the input image to construct a seed image, the seed image having the property that it contains pixels only in the halftone regions and that it contains at least one pixel in every halftone region;
  processing the input image to form a clipping mask, the clipping mask having the property that it covers all ON pixels in the halftone regions and that any part of the clipping mask that covers a non-halftone region does not touch a part of the clipping mask that covers a halftone region; and
  processing the seed image and the clipping mask so as to grow the seed and clip the seed, thus grown, to the clipping mask;
  whereby the seed, thus grown and clipped, provides a representation of a separation mask.

5. A method performed in a digital processor for processing halftone regions in a binary input image, comprising the steps of:
  determining whether halftone regions exist in the input image; and
  only if halftone regions exist, constructing a representation of a separation mask by performing the sub-steps of
  processing the input image to construct a seed image, the seed image having the property that it contains pixels only in the halftone regions and that it contains at least one pixel in every halftone region,
  processing the input image to form a clipping mask, the clipping mask having the property that it covers all ON pixels in the halftone regions and that any part of the clipping mask that covers a non-halftone region does not touch a part of the clipping mask that covers a halftone region, and
  processing the seed image and the clipping mask so as to grow the seed and clip the seed, thus grown, to the clipping mask.

6. The method of claim 1 or 2 or 4 or 5 wherein said steps of growing and clipping comprise:
  (a) on a first pass, copying the seed to define a current version;
  (b) dilating the current version;
  (c) ANDing the clipping mask and the current version to define an iterated version;
  (d) comparing the copy of the current version with the iterated version; and
  (e) only if they are unequal, copying the iterated version to redefine the current version and repeating steps (b) through (d).

7. The method of claim 1 or 2 or 4 or 5 wherein said step of constructing a clipping mask comprises subjecting the image to a set of operations that eliminates OFF pixels that are near ON pixels.

8. The method of claim 7 wherein said set of operations includes at least one thresholded reduction to solidify textured areas.

9. The method of claim 1 or 2 or 4 or 5, and further comprising the step of logically combining the separation mask and the original binary image to extract image separations.

10. The method of claim 1 or 2 or 4 or 5, and further comprising the steps of:
providing a set of spatial filters, each of which corresponds to a particular respective set of halftone characteristics;
selecting at least a portion of the original binary image, called the selected portion;
applying each of the spatial filters to the selected portion to provide a respective indication of the extent to which the selected portion exhibits the respective set of halftone characteristics; and
selecting the spatial filter that provides the greatest indication.

11. The method of claim 10 wherein said step of constructing a seed comprises:
eroding the input image with the selected spatial filter;
subjecting the image, thus eroded, to at least one thresholded reduction to provide a resulting image; and
subjecting the resulting image to an open operation.

12. The method of claim 10 wherein each of the filters is a hit-miss structuring element having a pattern of five ON pixels located at the center and corners of a square and four OFF pixels located generally midway between the center and corners of the square.

13. The method of claim 1 or 2 or 4 or 5 wherein said step of constructing a clipping mask comprises at least one thresholded reduction to solidify textured areas.

14. The method of claim 1 or 2 or 4 or 5, and further comprising the step of determining the halftone characteristics.

15. The method of claim 14 wherein said step of determining the halftone characteristics comprises the steps of:
providing a set of narrow bandpass filters, each of which corresponds to a particular respective set of halftone characteristics;
eroding at least a portion of the image with each of the filters;
counting the ON pixels for each erosion; and
choosing the filter that gives the largest number.

16. The method of claim 15 wherein each of the filters is a hit-miss structuring element having a pattern of five ON pixels located at the center and corners of a square and four OFF pixels located generally midway between the center and corners of the square.

17. The method of claim 1 wherein said step of determining whether halftone regions exist comprises the steps of:
dividing the input image into subregions;
determining the approximate number of pixel transitions in each subregion;
picking the subregion with the greatest number of pixel transitions; and
comparing that number to a threshold, above which a subregion is considered to be largely halftoned.

18. The method of claim 17 wherein said step of determining the approximate number of pixel transitions comprises the steps of:
duplicating the subregion so that there are first and second copies of the subregion;
eroding one copy of the subregion with a horizontal SE of adjacent ON pixels;
XORing the copy of the subregion, thus eroded, with the other copy of the subregion; and
counting ON pixels remaining.

19. The method of claim 17 or 4, and further comprising the steps of:
providing a set of narrow bandpass filters;
eroding the subregion with the greatest number of pixel transitions with each of these filters;
counting the ON pixels for each erosion; and
choosing the filter that gives the largest number.

20. The method of claim 19 wherein each of the filters is a hit-miss structuring element having a pattern of five ON pixels located at the center and corners of a square and four OFF pixels located generally midway between the center and corners of the square.

21. The method of claim 1 or 4 or 5 wherein said step of constructing a seed comprises the steps of:
providing a set of spatial filters, each of which corresponds to a particular respective set of halftone characteristics;
selecting at least a portion of the input image;
applying each of the spatial filters to the selected portion to provide a respective indication of the extent to which the selected portion exhibits the respective set of halftone characteristics;
selecting the spatial filter that provides the greatest indication;
eroding the input image with the selected spatial filter;
subjecting the image, thus eroded, to at least one thresholded reduction to provide a resulting image; and
subjecting the resulting image to an open operation.

22. The method of claim 21 wherein each of the filters is a hit-miss structuring element having a pattern of five ON pixels located at the center and corners of square and four OFF pixels located generally midway between the center and corners of the square.

23. The method of claim 1 or 4 or 5 wherein said step of constructing a seed comprises the steps of:
subjecting the input image to at least one thresholded reduction at a low threshold value to provide a resulting image;
subjecting the resulting image to at least one thresholded reduction at a high threshold level to provide a further resulting image; and
subjecting the further resulting image to an open operation.

24. The method of claim 1 or 5 wherein said step of determining whether halftone regions exist comprises the steps of:
dividing the image into subregions;
determining the approximate number of pixel transitions in each subregion;
picking the subregion with the greatest number; and
comparing that number to a threshold, above which a subregion is considered to be largely halftoned.

25. The method of claim 24 wherein said step of determining the approximate number of pixel transitions comprises the steps of:
duplicating the subregion so that there are first and second copies of the subregion;
eroding one copy of the subregion with a horizontal SE of adjacent ON pixels;
XORing the copy of the subregion, thus eroded, with the other copy of the subregion; and
counting ON pixels remaining.

* * * * *